United States Patent
Blanksby et al.

(10) Patent No.: US 6,744,814 B1
(45) Date of Patent: Jun. 1, 2004

(54) METHOD AND APPARATUS FOR REDUCED STATE SEQUENCE ESTIMATION WITH TAP-SELECTABLE DECISION-FEEDBACK

(75) Inventors: Andrew J. Blanksby, Bradley Beach, NJ (US); Erich Franz Haratsch, Bradley Beach, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/540,031

(22) Filed: Mar. 31, 2000

(51) Int. Cl.$^7$ ................................................. H03H 7/30
(52) U.S. Cl. ...................... 375/232; 375/348; 375/229; 375/233
(58) Field of Search ................................. 375/340, 348, 375/229, 232, 233, 316, 324, 346

(56) References Cited

U.S. PATENT DOCUMENTS 6,535,554 B1 * 3/2003 Webster et al. ............. 375/233

OTHER PUBLICATIONS

E. F. Haratsch "High–Speed VLSI Implementation of Reduced Complexity Sequence Estimation Algorithms with Application to Gigabit Ethernet 1000Base–T", VLSI Technology, Systems, and Applications, 1999. International Symposium Jun. 8–10, 1999, pp. 171–174.*
R. Raheli, G. Marino, and P. Castoldi, "Per–survivor processing and tentative decisions: What is in Between?", IEEE Trans, Commun,. vol. 44, pp. 127–129, Feb. 1996.*

* cited by examiner

Primary Examiner—Stephen Chin
Assistant Examiner—Guillermo Munoz
(74) Attorney, Agent, or Firm—Steve Mendelsohn; Ian M. Hughes

(57) ABSTRACT

A method and apparatus are disclosed for reducing the computational complexity of the RSSE technique. The apparatus and associated method does not assume that the signal energy of a pulse that has gone through a channel is always concentrated primarily in the initial taps, as is true for a minimum phase channel. The present invention, however, recognizes that the signal energy is often concentrated in just a few channel coefficients, with the remaining channel coefficients being close to zero. A receiver apparatus and associated method is disclosed for reducing the number of channel coefficients to be processed with a high complexity cancellation algorithm from L to V+K which contain the majority of the signal energy, while processing the L–(K+V) non-selected coefficients with a lower complexity algorithm. By only processing the intersymbol interference caused by a reduced number of channel coefficients (i.e., L–(K+V)) using the tap-selectable TS-RSSE technique, while processing the intersymbol interference caused by the remaining channel coefficients with the tap-selectable decision feedback prefilter TS-DFP technique, a good bit error rate (BER) versus signal-to-noise ratio (SNR) performance is insured for a well-chosen value of V, where V represents the number of channel coefficients processed with the TS-RSSE technique (i.e., high complexity algorithm). No presumption is made apriori concerning which V taps will be processed by the TS-RSSE algorithm, but rather, an a posteriori determination is made in response to a changing channel impulse response.

48 Claims, 25 Drawing Sheets

METHOD AND APPARATUS FOR REDUCED STATE SEQUENCE ESTIMATION WITH TAP-SELECTABLE DECISION-FEEDBACK

BACKGROUND OF THE INVENTION

1. Field of the Invention

The invention relates generally to equalization and decoding in communication systems, and in particular, to sequence estimation techniques with reduced complexity.

2. Discussion of the Prior Art

A limiting factor in the performance of digital communication systems which are designed to transmit digital data over a time-dispersive channel is intersymbol interference (ISI). FIG. 1 shows the block diagram for a conventional receiver 100 in a channel environment associated with, for example, the Gigabit Ethernet 1000 Base-T standard. As shown in FIG. 1, the receiver 100 includes an analog-to-digital (A/D) converter 110 for converting the received analog signal to a digital signal. The digitized data is then processed by a feed forward equalizer (FFE) 120; an echo canceller 130 and a crosstalk canceller 140. Generally, the feed forward equalizer (FFE) 120 makes the channel impulse causal, and additionally whitens the noise. In addition, the echo canceller 130 removes echo from the received signal and the crosstalk canceller 140 removes the crosstalk, as is well known in the art. The equalizer/decoder 150 performs data detection, for example, using maximum likelihood sequence estimation (MLSE), to produce output symbols or bits.

It is well known that MSLE is the optimum method for the recovery of a data sequence in the presence of ISI and additive white Gaussian noise (AWGN). For a more detailed discussion of a maximum likelihood sequence estimation (MLSE), see G. D. Forney Jr., "Maximum-likelihood sequence estimation of digital sequences in the presence of intersymbol interference," IEEE Trans. Inform. Theory, vol. IT-18, pp. 363–378, May 1972, incorporated by reference herein.

The Viterbi Algorithm is a computationally efficient implementation of MLSE, however, it requires an excessive amount of computing power for most practical channels found in broadband communication systems. For a more detailed discussion of the Viterbi algorithm, see G. D. Forney, Jr. "The Viterbi Algorithm," Proc. IEEE, vol. 61, pp. 268–278, March 1973. Several sub-optimal modifications to the Viterbi algorithm have been introduced to reduce the computational complexity of the Viterbi algorithm. One such technique is reduced state sequence estimation (RSSE). Referring to FIG. 1, block 150, the equalizer/decoder may be implemented as an RSSE circuit. Two special cases of RSSE are Decision-feedback sequence estimation (DFSE), and parallel decision feedback decoding (PDFD). DFSE employs a trellis that takes into account only the first K of the L channel coefficients $\{f_i\}$, $1 \leq i \leq L$, where L is the channel memory. PDFD is a special case of DFSE when K=0, where the reduced trellis becomes the TCM code trellis and decision feedback equalization is performed for each code state based on its survivor history. For a discussion of reduced state sequence estimation (RSSE) techniques and for the special cases (i.e., DFSE and PDFD), see, for example, P. R. Chevillat and E. Eleftheriou, "Decoding of Trellis-Encoded Signals in the Presence of Intersymbol Interference and Noise", IEEE Trans. Commun., vol. 37, 669–76, (July 1989) and M. V. Eyuboglu and S. U. H. Qureshi, "Reduced-State Sequence Estimation For Coded Modulation On Intersymbol Interference Channels", IEEE JSAC, vol. 7, 989–95 (August 1989), each incorporated by reference herein. RSSE is well suited for implementation in dedicated hardware due to its high parallelism, unlike other reduced complexity sequence estimation techniques such as the M-algorithm. For a discussion of M-algorithms (MA), see, for example, N. Seshadri and J. B. Anderson, "Decoding of Severely Filtered Modulation codes Using the (M,L) Algorithm", IEEE JSAC, vol. 7, 1006–1016 (August 1989), incorporated by reference herein. Although RSSE has been proposed as a means to reduce the computational complexity of MLSE, the hardware cost of RSSE can still be very high.

FIG. 2 is an implementation of an RSSE equalizer/decoder which attempts to reduce the intersymbol interference associated with all channel coefficients, $\{f_i\}$, $1 \leq i \leq L$, of the channel impulse response with memory L. The R decision feedback cells 209 of FIG. 2 compute R ISI estimates in the decision feedback unit (DFU) 208 based on the survivor symbols from the corresponding survivor path cells 207 of FIG. 2 in the survivor memory unit (SMU) 206. These estimates are fed into the branch metric unit (BMU) 202 in which each branch metric cell 203 of FIG. 2 computes the b metrics for the transitions emanating from the corresponding state. In the add/compare select unit (ACSU) 204 each add/compare select cell selects the best survivor path among all paths entering the state.

While RSSE reduces the complexity of MLSE, its hardware costs can still be very high in practical applications. To reduce the hardware costs of RSSE, it has been proposed to account only for the ISI introduced by the first U taps of the channel impulse response, $\{f_i\}$, $1 \leq i \leq U$ with an RSSE structure 302, as shown in FIG. 3, and cancel the remaining ISI with a simple equalizer structure 304. Referring again to block 150 of FIG. 1, it was previously stated that block 150 could be implemented as structure 200 of FIG. 2. Structure 300 of FIG. 3 represents another possible structure to implement block 150 to reduce the complexity of MLSE.

FIG. 4 is an illustration of the RSSE structure 302 of FIG. 3. In the decision feedback unit (DFU) 408 each decision feedback cell 409 takes care of the ISI introduced by the first U channel coefficients, $\{f\}$, $1 \leq i \leq U$, where the number U is predetermined. The ISI from only the first U channel coefficients are considered in the RSSE apparatus 302 of FIG. 3 based on an assumption that the channel impulse response which is seen by the equalizer/decoder (See block 150 of FIG. 1) is concentrated in the first U taps, as shown by the graph of signal energy v. coefficient index, i, in FIG. 5a. Further, Block 304 of FIG. 3 reduces the intersymbol interference from other than the first U taps, $\{f_i\}$, $U+1 \leq i \leq L$. This assumption is often valid for a minimum phase channel, however, in general the channel impulse response may be concentrated in taps other than the first U taps (e.g. Gigabit Ethernet over copper), or components in the tail of the channel impulse response may be significant. Furthermore, the distribution of the channel impulse response may change over time. As such, the channel energy will be concentrated in different taps as a function of time. FIG. 5b illustrates a channel impulse response graph with significant channel coefficients in the tail. In these cases the reduced complexity RSSE equalizer/decoder 300 of FIG. 3, would exhibit significantly inferior performance. Thus, there is a need for a low computationally complex RSSE equalizer/decoder that exhibits acceptable performance in a wide variety of channel impulse responses and which is adaptively reconfigurable in response to changing channel environments and does not change the number of states as disclosed in the prior art.

SUMMARY OF THE INVENTION

The present invention provides an apparatus and method for reducing the computational complexity of the RSSE technique by reducing the intersymbol interference caused by significant channel coefficients with a tap selectable TS-RSSE (i.e., high complexity equalization and decoding algorithm). The more significant channel coefficients are adaptively selected in response to changes in the channel impulse response. Further, the intersymbol interference caused by the less significant channel coefficients is processed by a tap selectable decision feedback prefilter TS-DFP (i.e., a low complexity equalization algorithm). Referring again to FIG. 1, which is an illustration of the channel environment associated with, for example, the Gigabit Ethernet 1000 Base-T standard, the equalizer/decoder of the present invention could be used to implement the block 150. Utilizing the equalizer/decoder of the present invention to implement block 150 is advantageous because of its reduced complexity and also because of its improved adaptivity to a changing channel impulse response as compared to the prior art.

The present invention is based on the observation that for a communication channel having a channel memory L and comprising L+1 channel coefficients, $\{f_i\}$, $0 \leq i \leq L$, only a subset of the L channel coefficients associated with the memory, $\{f_i\}$, $1 \leq i \leq L$, will contribute most significantly to the intersymbol interference caused by the channel. Prior art approaches have assumed the most significant coefficients associated with the channel memory to be concentrated in the initial taps of the channel impulse response $\{f_i\}$, $1 \leq i \leq U$. However, this assumption does not hold true in some applications like Gigabit ethernet over copper or broadband wireless communication systems. In these cases, it cannot be foreseen which of the L channel coefficients contribute most significantly to the intersymbol interference. The present invention determines these most significant coefficients adaptively, and then processes the intersymbol interference caused by them using a tap-selectable RSSE, i.e., TS-RSSE. The present invention also adaptively processes the intersymbol interference caused by the less significant coefficients with a tap selectable DFP technique (TS-DFP). With each change of the channel impulse response, a new determination is made concerning which of the L channel coefficients associated with the memory, i.e., $\{f_i\}$, $1 \leq i \leq L$, are to be adaptively selected for processing in accordance with either the TS-DFP technique or the TS-RSSE technique. It should be noted, that unlike prior art implementations the present invention does not reduce the number of states of the trellis considered by the tap selectable RSSE technique (TS-RSSE).

Accordingly, the invention provides a receiver apparatus and associated method for reducing the number of channel coefficients whose intersymbol interference is to be processed with the high complexity TS-RSSE cancellation algorithm. In a preferred embodiment, channel coefficients are adaptively selected as contributing most significantly to the intersymbol interference, and are processed by the TS-RSSE technique. The non-selected channel coefficients are processed with a TS-DFP technique.

The determination as to which channel coefficients contribute most significantly to the intersymbol interference is implemented in a number of alternate embodiments. In a first embodiment, channel coefficients are adaptively selected for processing by the TS-RSSE technique based on whether the coefficient's squared or absolute value is above a predetermined threshold. Those coefficients exceeding the threshold will be processed by the TS-RSSE technique, and those coefficients below the threshold will be processed by the TS-DFP technique.

In a second embodiment, channel coefficients are adaptively selected for processing by the TS-RSSE technique by establishing a threshold and summing the squared or absolute value of the channel coefficients in decreasing squared or absolute value order until the threshold is met. The intersymbol interference associated with the channel coefficients which collectively sum to the threshold value are processed by the TS-RSSE technique. While the intersymbol interference associated with those coefficients not included in the summation are processed by the TS-DFP technique.

In a third embodiment, channel coefficients are adaptively selected for processing by the TS-RSSE technique by selecting only those channel coefficients whose absolute or squared value is highest. A prescribed number of coefficients may be selected for inclusion in the set.

The receiver of the present invention is referred to as a tap-selectable RSSE equalizer/decoder (TS-RSSE) with a tap-selectable decision prefilter (TS-DFP). The channel impulse response is modeled in the receiver by L+1 taps, $\{f_i\}$, $0 \leq i \leq L$, (i.e., the memory is L). The first K taps associated with the channel memory, $\{f_i\}$, $1 \leq i \leq K$, are referred to as non-selectable taps and are processed with a high complexity TS-RSSE cancellation algorithm. The remaining taps associated with the channel memory, $\{f_i\}$, $K+1 \leq i \leq L$, are referred to as selectable taps and are analyzed to adaptively select V taps to achieve a reasonably low bit error rate BER. The tap selection process is adaptive in the sense that the V taps identified in any selection period change with a changing channel environment. The intersymbol interference caused by the adaptively selected V taps are processed with the high complexity TS-RSSE cancellation algorithm. The intersymbol interference caused by the non-selected L−(K+V) taps are processed with a lower complexity TS-DFP cancellation algorithm.

The adaptive TS-RSSE equalizer/decoder of the present invention advantageously reduces the complexity of a conventional RSSE equalizer/decoder (See FIG. 2) by only processing the intersymbol interference caused by a reduced number of channel coefficients with a high complexity TS-RSSE equalizer/decoder and processing the intersymbol interference caused by the remaining channel coefficients with a lower complexity TS-DFP circuit. The present invention is advantageous over the prior art RSSE equalizer/decoder in that the prior art RSSE equalizer/decoder processes the intersymbol interference due to all channel coefficients of the channel impulse response. By contrast, the present invention is of lower complexity by virtue of only processing the intersymbol interference caused by a reduced number of channel coefficients with a TS-RSSE circuit. The present invention, however, does not further change the number of states which are processed in the RSSE circuit, which facilitates the implementation in dedicated hardware and preserves the bit error rate performance of a conventional RSSE circuit. Further, the receiver of the present invention provides superior performance over a prior art reduced complexity RSSE equalizer/decoder, as illustrated in FIG. 3, in that the prior art receiver assumes that the more significant channel coefficients are located in the beginning of the channel impulse. Advantageously, the hardware increase in constructing a TS-RSSE equalizer/decoder of the present invention over a reduced complexity RSSE equalizer/decoder of the prior art, as shown in FIGS. 3 and 4 is moderate. No presumption is made apriori concerning which channel coefficients are more significant to process their associated intersymbol interference by the TS-RSSE circuit, but rather, an a posteriori determination is made in response to a changing channel impulse response.

BRIEF DESCRIPTION OF THE DRAWINGS

The features of the disclosed tap selectable equalizer/decoder and method will become more readily apparent and may be better understood by referring to the following detailed description of an illustrative embodiment of the present invention, taken in conjunction with the accompanying drawings, where:

FIG. 22 is another embodiment of a tap-selectable DFP (TS-DFP) of FIG. 20;

DETAILED DESCRIPTION OF THE PREFERRED EMBODIMENTS

Figure 1:
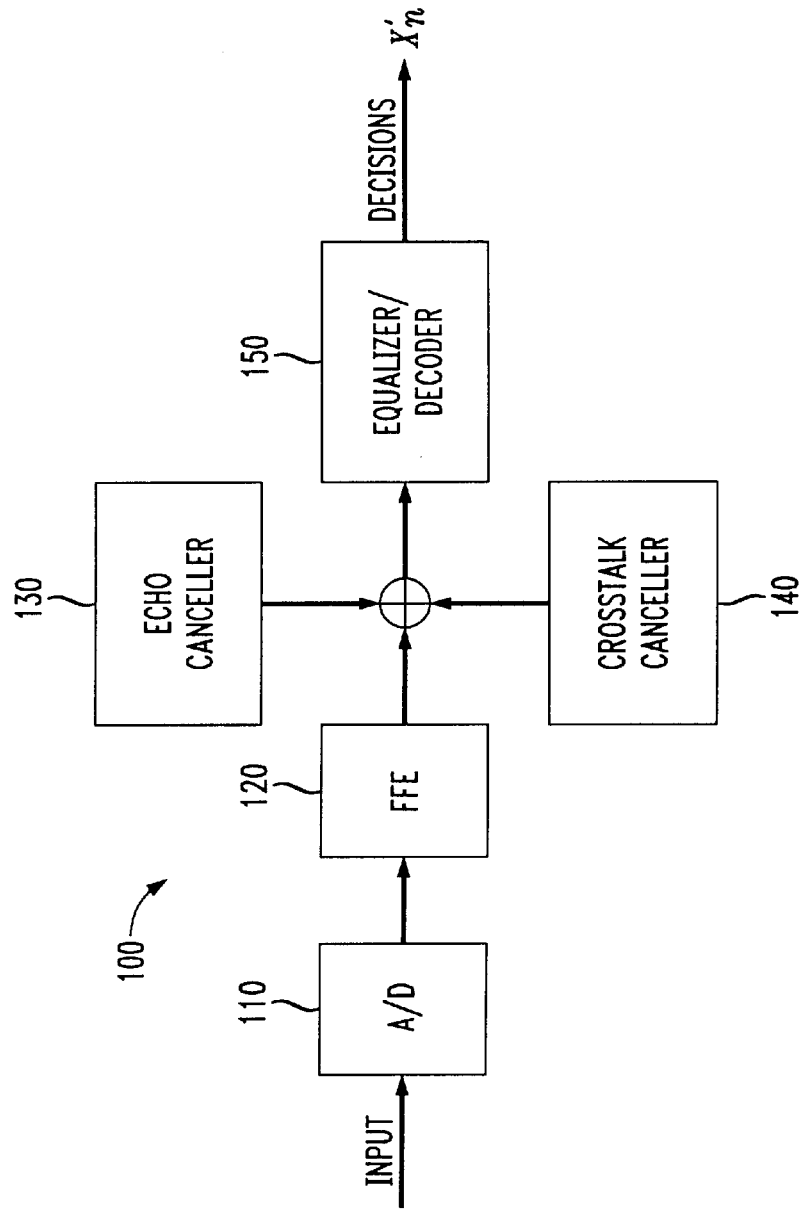
FIG. 1 is a schematic block diagram of a prior art receiver.
Figure 2:
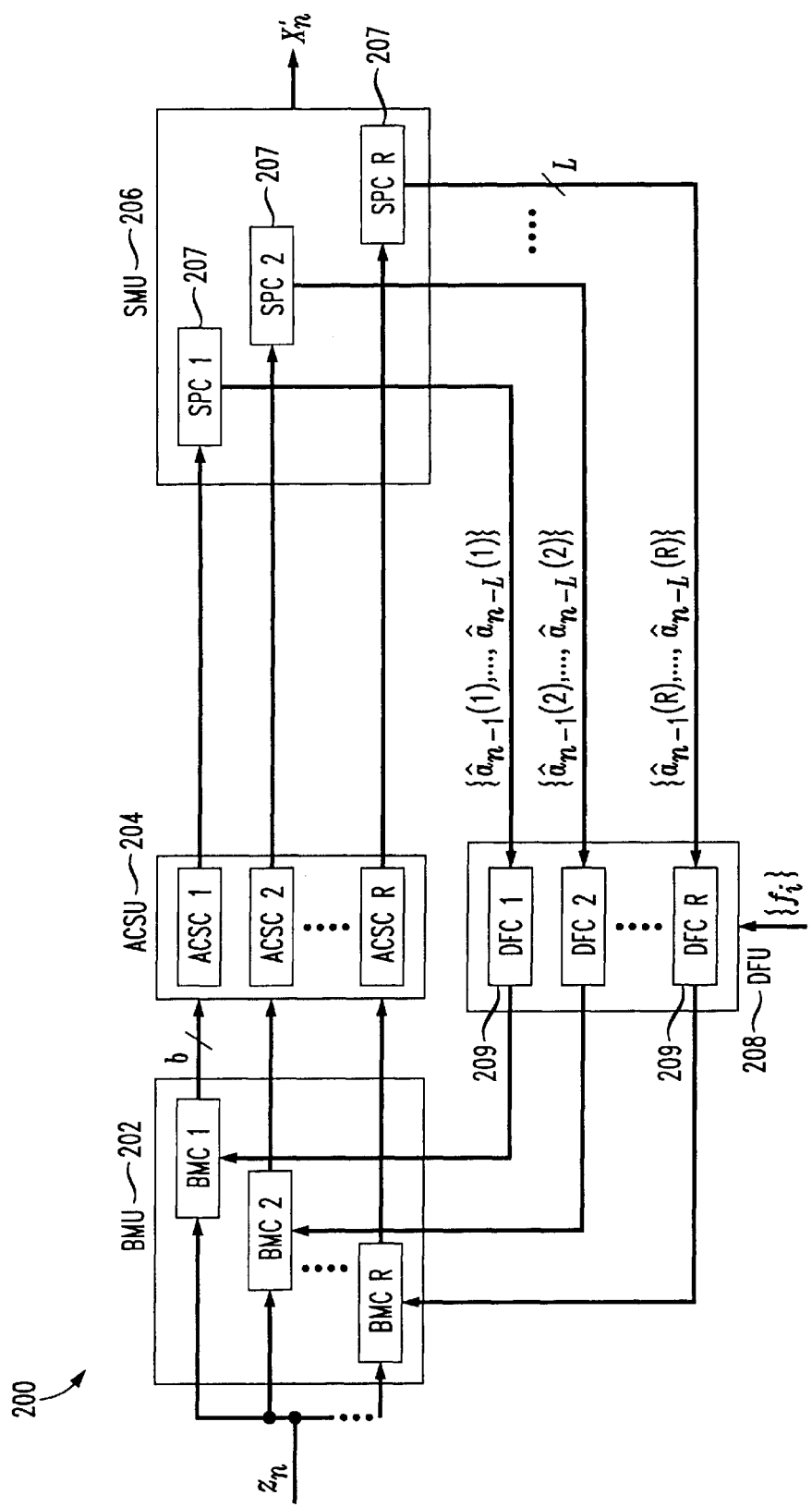
FIG. 2 is a schematic block diagram of an RSSE equalizer/decoder according to the prior art.
Figure 3:
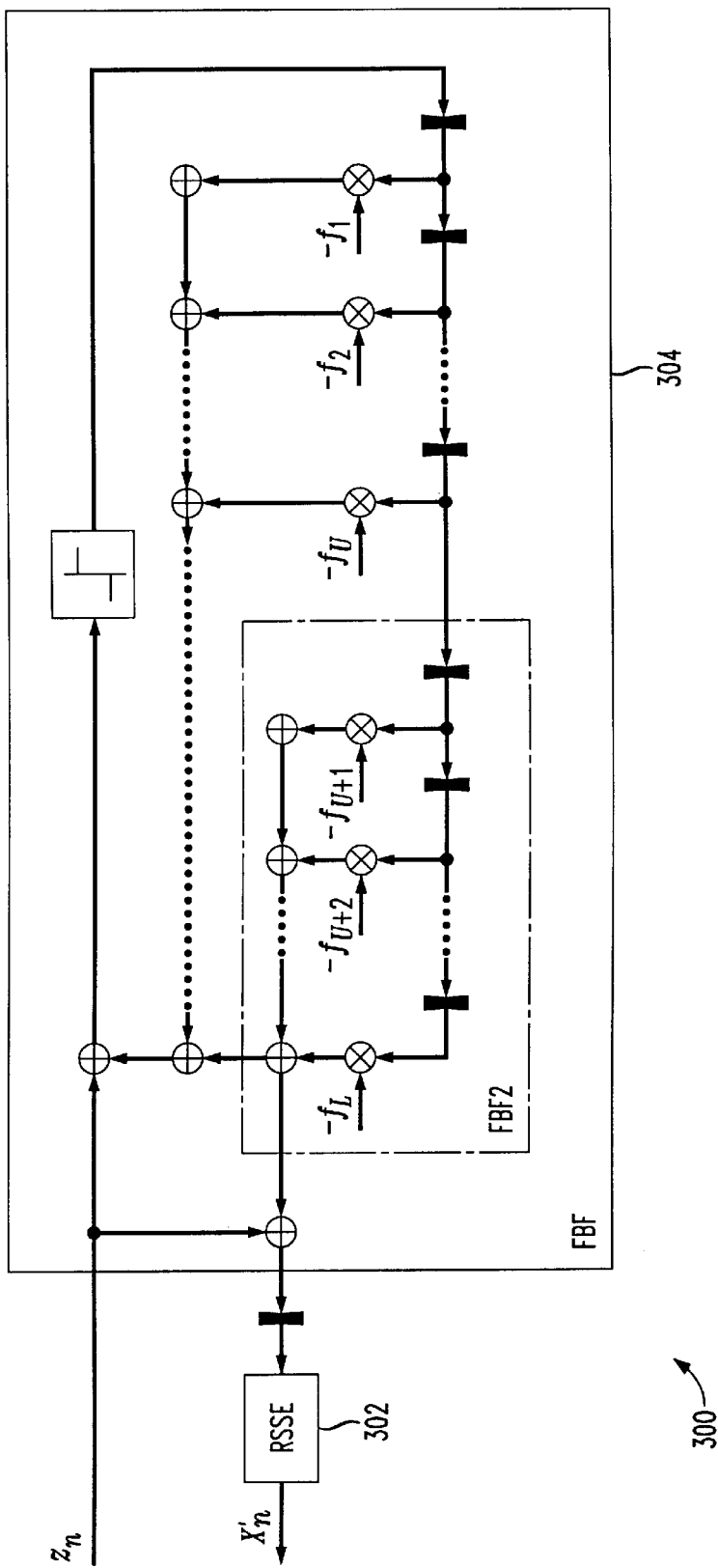
FIG. 3 is a schematic block diagram of a reduced complexity RSSE equalizer/decoder according to the prior art.
Figure 4:
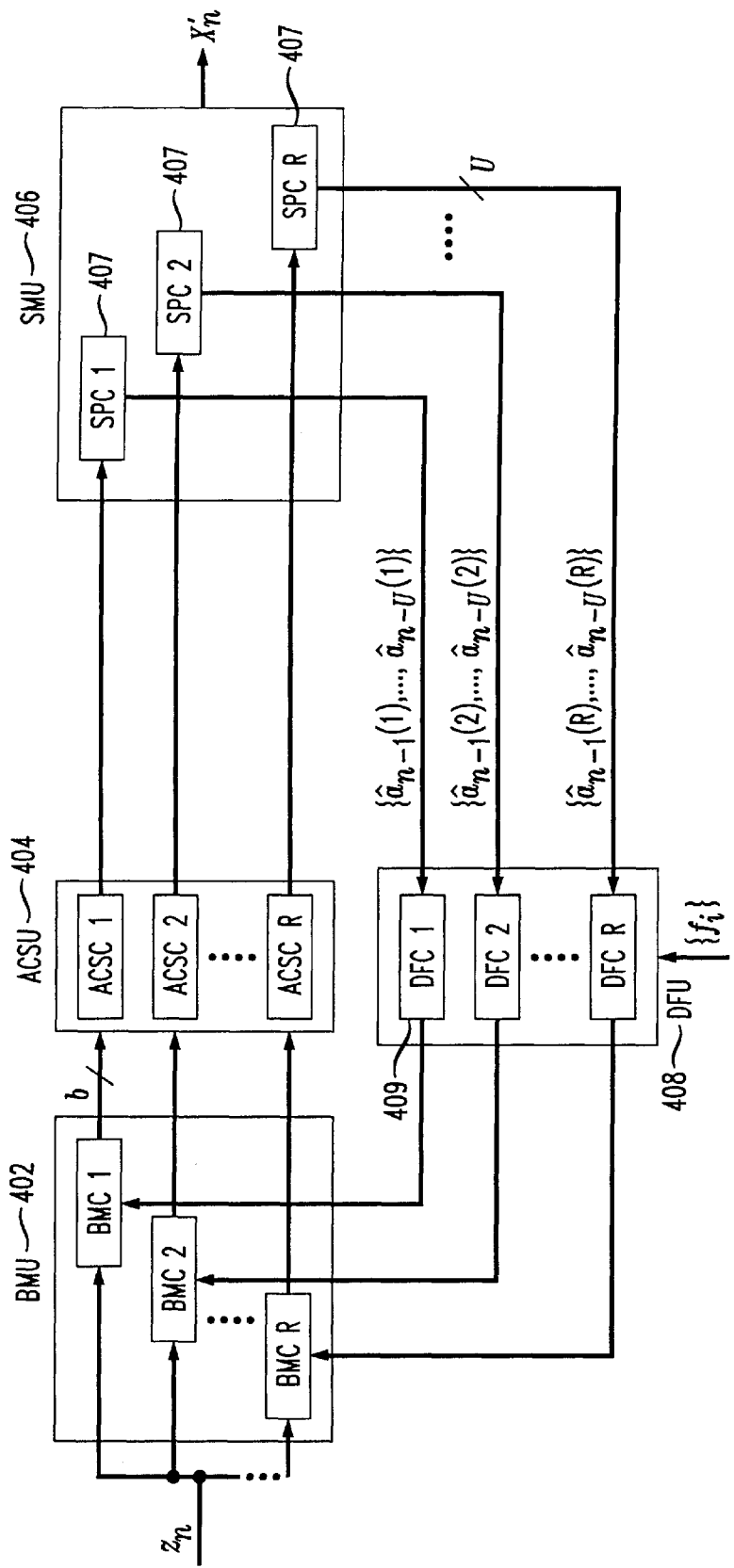
FIG. 4 is a schematic block diagram of an RSSE structure of FIG. 3.
Figure 5A:
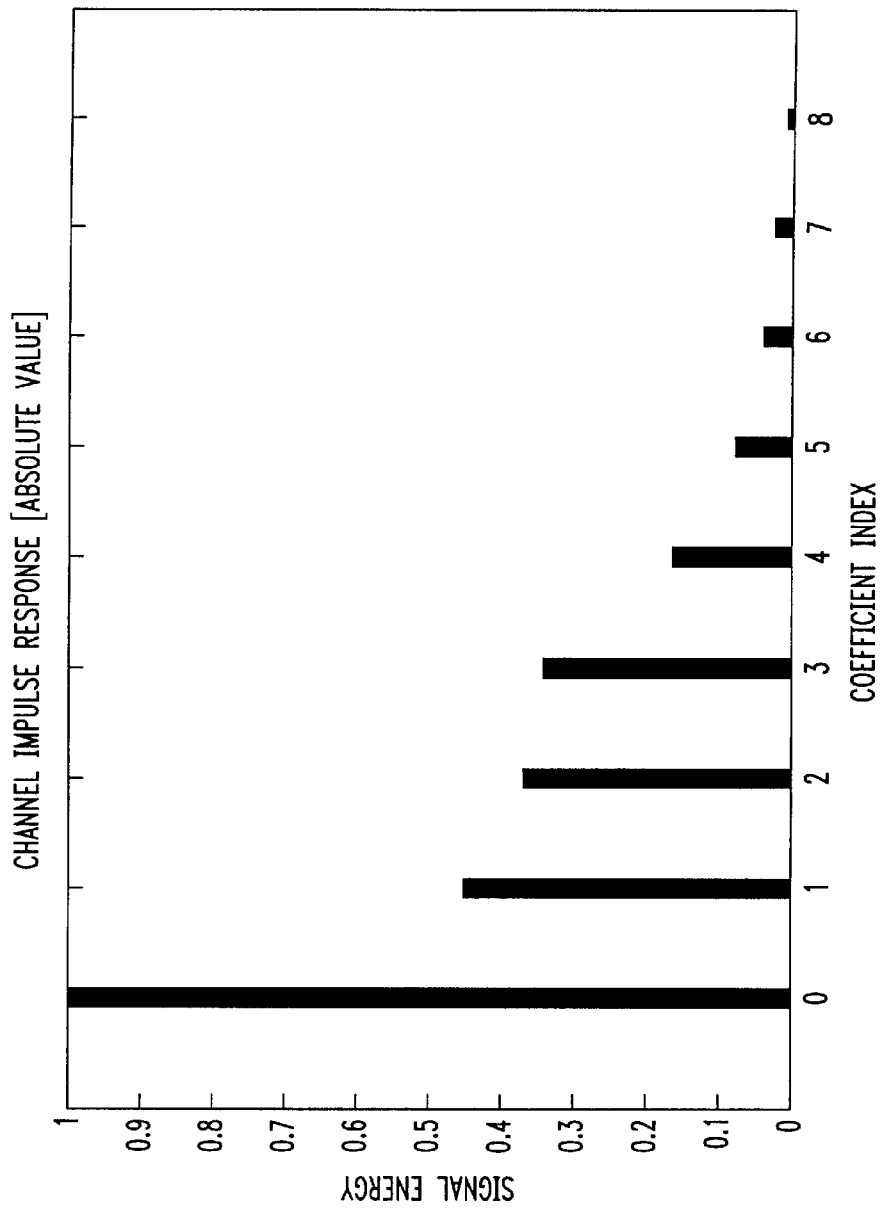
FIG. 5a is graph illustrating the channel impulse response of a minimum phase channel.
Figure 5B:
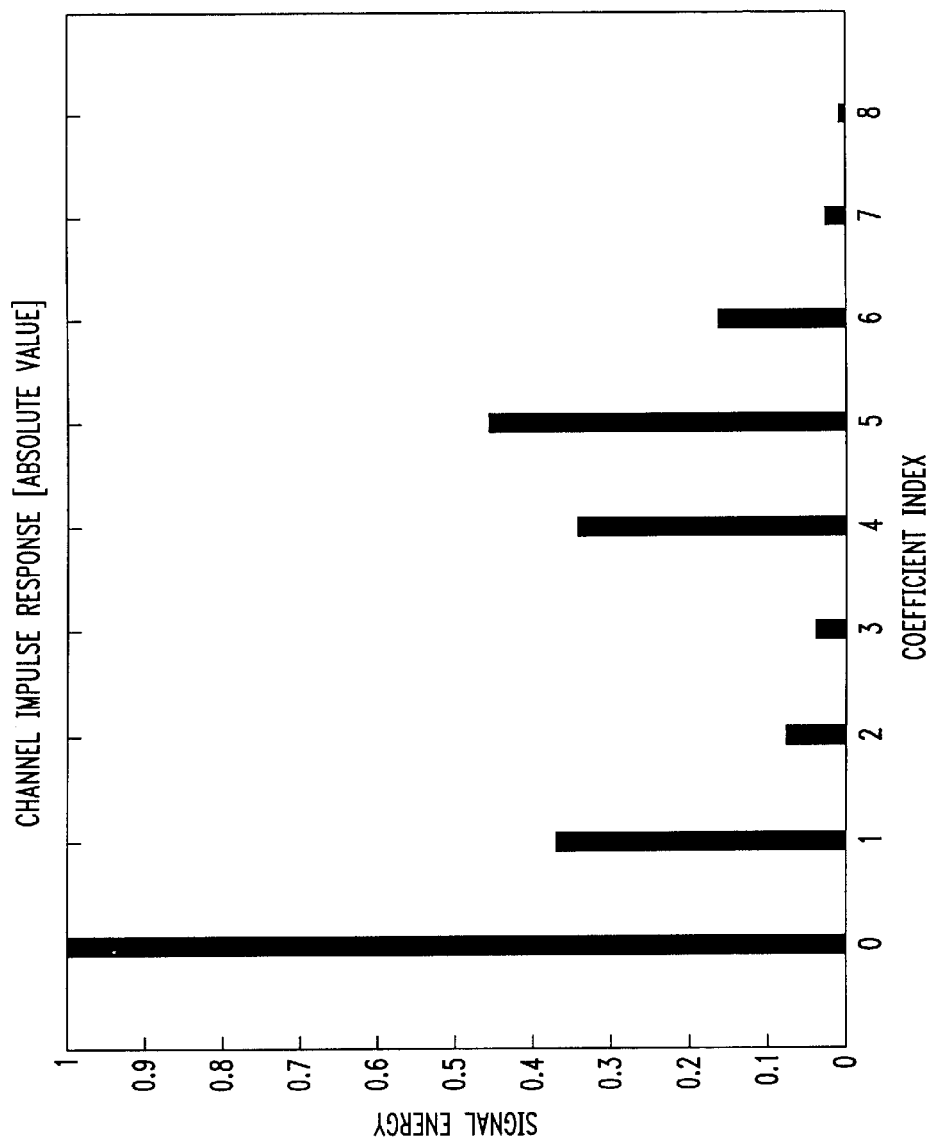
FIG. 5b is a graph illustrating the channel impulse response with significant energy in the tail.
Figure 6:
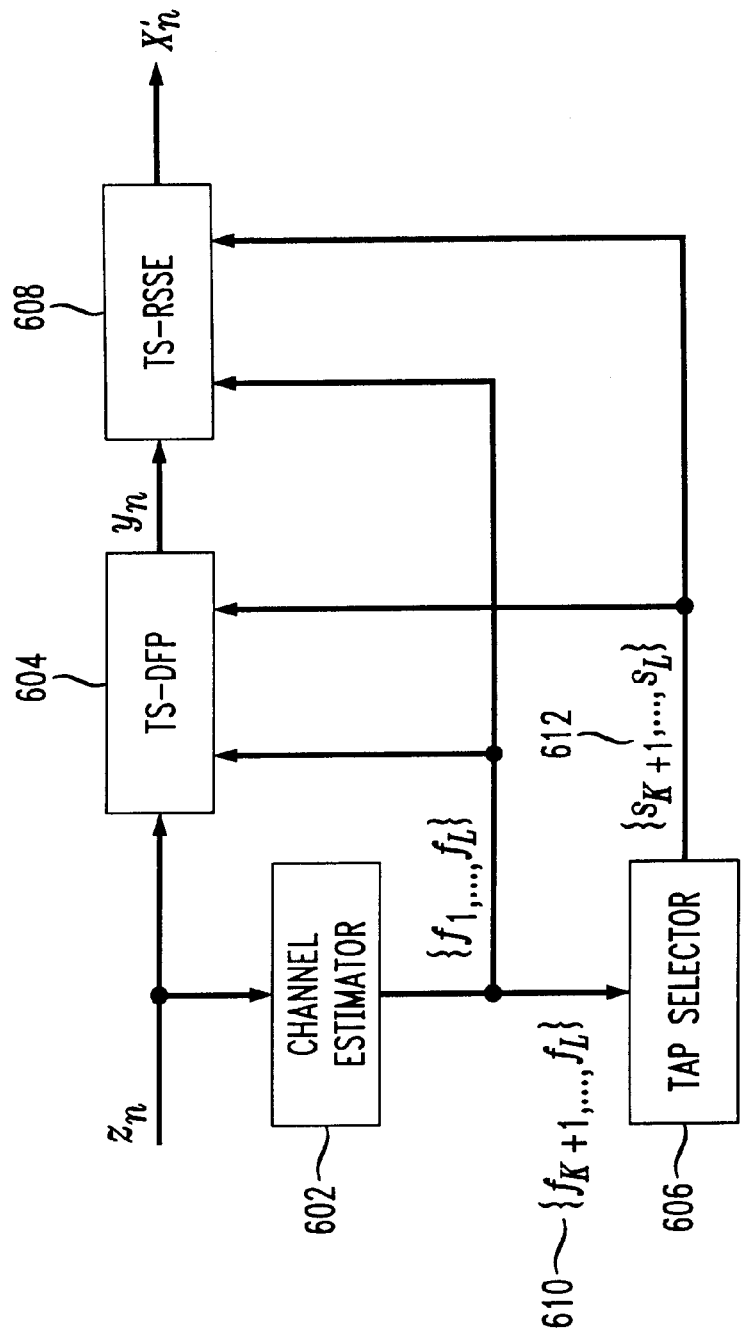
FIG. 6 is a schematic block diagram of a tap selectable RSSE equalizer/decoder (TS-RSSE) with a tap selectable decision feedback prefilter (TS-DFP)

FIG. 6 illustrates an equalizer/decoder 600 in accordance with the present invention that reduces the computational complexity of reduced state sequence estimation (RSSE) algorithm for a given number of states. The receiver of the present invention is designed for a communication system based on the channel model using a discrete time FIR filter, having a channel memory of L, where the channel impulse response is assumed to have a length of (L+1) symbol periods denoted by $\{f_i\}$ $i\epsilon[0,\ldots,L]$ where $f_i$ is the coefficient for channel tap i, and the zeroeth tap of the channel impulse response, $f_0$, is assumed to be one without loss of generality. The zeroeth tap is not in the memory and just multiplies the signal. The discrete time channel model presumes a trellis coded modulation (TCM) system which is corrupted by intersymbol interference and additive white gaussian noise (AWGN).

Figure 7:
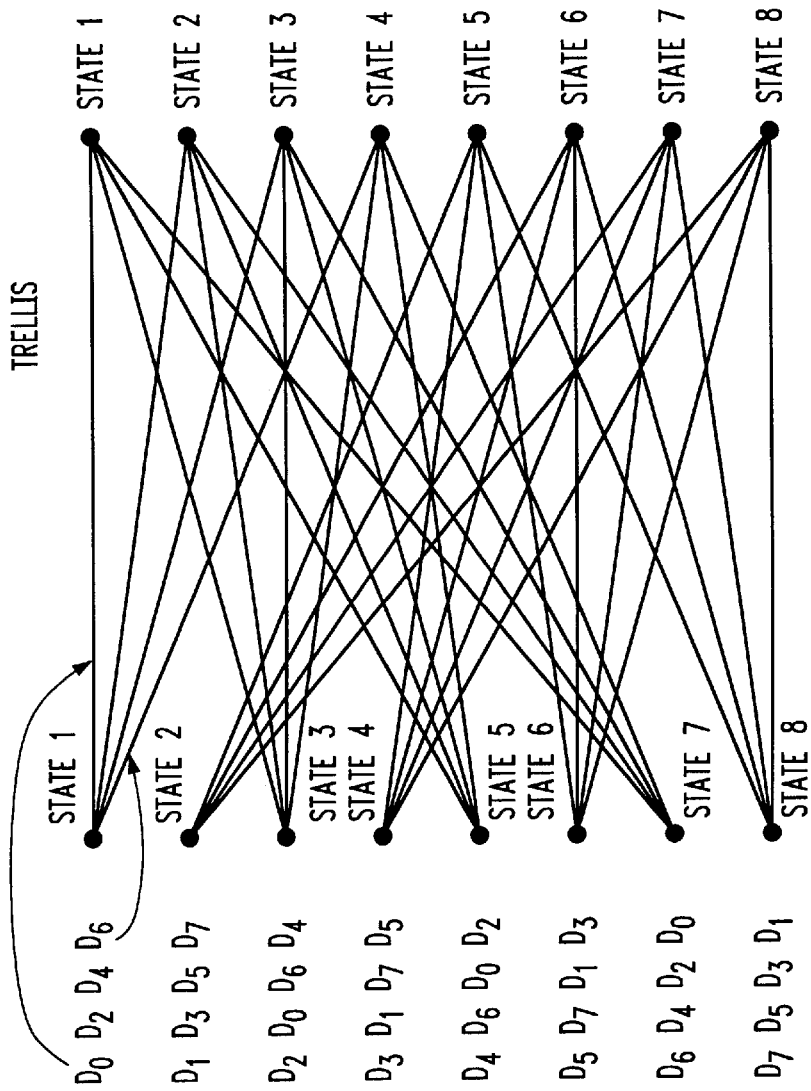
FIG. 7 illustrates the discrete states of a trellis code associated with Gigabit Ethernet 1000Base-T.

FIG. 7 illustrates the discrete states of a trellis code associated with Gigabit Ethernet 1000Base-T. It should be noted that present invention is equally applicable to non-trellis coded modulation systems.

Figure 8:
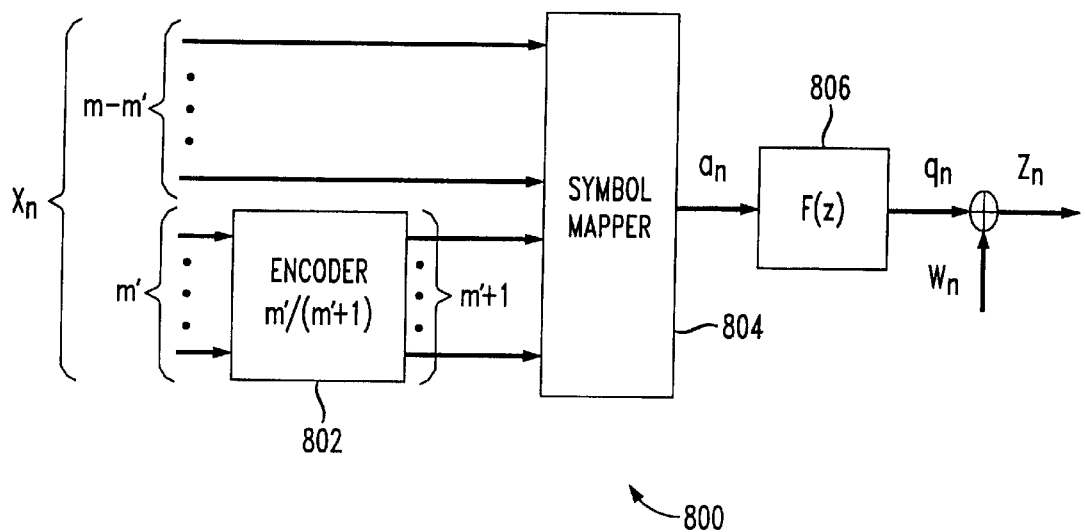
FIG. 8 is a diagram of a discrete time channel model using a discrete time FIR filter.

FIG. 8 illustrates the discrete time model of a communication system, generally designated as numeral 800. Information symbols $X_n$ consisting of m bits are fed into the TCM encoder 802. The rate m'/(m'+1) encoder operates on m' input bits and produces m'+1 encoded bits, which are used to select one of the $2^{m'+1}$ subsets (each of size $2^{m-m'}$) from the employed signal constellation of size $2^{m+1}$ by the symbol mapper 804, while the uncoded bits are used to select one symbol $a_n$ within the chosen subset. The selected symbol is sent over the equivalent discrete-time channel modeled as a discrete time FIR filter 806. The channel output $z_n$ at time instant n is given by $$z_n = q_n + w_n = \sum_{i=0}^{L} f_i \cdot a_{n-i} + w_n \tag{1}$$

where $q_n$ is the signal corrupted by ISI, $\{f_i\}$, $i\epsilon[0,\ldots,L]$ are the tap coefficients of the equivalent discrete-time channel impulse response (CIR) ($f_0=1$ is assumed without loss of generality), L is the length of the channel memory, and $\{w_n\}$ represents white Gaussian noise with zero mean and variance $\sigma^2$.

According to a feature of the present invention, the intersymbol interference caused by the L tap coefficients associated with the channel memory, $\{f_i\}$, $1 \leq i \leq L$, are processed in either the TS-DFP 604 or the TS-RSSE 608 under the control of the tap selector 606. The TS-DFP 604 is discussed further below in conjunction with FIG. 10–13, and the TS-RSSE 508 is discussed further below in conjunction with FIGS. 14–19.

In accordance with a preferred embodiment of the invention, the first K tap coefficients associated with the channel memory, $\{f_i\}$, $1 \leq i \leq K$, belong to the set referred to herein as non-selectable tap coefficients $N=\{f_1,\ldots,f_K\}$, $|N|=K=$the number of elements in set N. The intersymbol interference caused by the channel coefficients associated with these tap coefficients is processed in the tap selectable reduced state sequence estimator TS-RSSE 608. Typically, the first K tap coefficients associated with the channel memory, $\{f_i\}$, $1 \leq i \leq K$, are also used to contribute to the TS-RSSE trellis structure, however, some number of taps other than K may be used for the construction of the trellis structure. That is, the number of taps selected for the TS-RSSE trellis structure may range from 0 to L and is independent of the number of non-selectable tap coefficients, denoted by K, selected for processing in the TS-RSSE 608.

The remaining K+1 through L tap coefficients, i.e., $\{f_i\}$ $i \in [K+1, \ldots, L]$, are collectively referred to herein as selectable taps, $S = \{f_{K+1}, \ldots, f_L\}$, $|S| = L - K$, and are further divided into two subsets, a set referred to as more significant selectable tap coefficients and a set referred to as less significant selectable tap coefficients. The set of more significant selectable tap coefficients is defined as set A, where $A = \{f_{i_j} | f_{i_j} \in S \hat{} (1 \leq j \leq V)\}$, $|A| = V$ =the number of elements in set A. Set A describes a set of tap coefficients having a set size equal to V, selected from among those coefficients in the set S (i.e., $f_{K+1}$ through $f_L$). Coefficient $f_{i_j}$ is characterized such that it is contained in set S (the set of selectable taps) and ($1 \leq j \leq V$). The set of less significant selectable taps is defined as set B, where B=S\A=set S without set A, and $|B| = L - K - V$ =the number of elements in set B. The tap selector 606 analyzes the set of selectable tap coefficients (i.e., set S) to select V tap coefficients as being more significant (i.e., set A), based on a predetermined criteria to be discussed below. The L−(K+V) taps not selected by the tap selector 606 are considered the less significant selectable tap coefficients (set B).

Table 1 below summarizes the processing the ISI caused by each of the L channel coefficients, $f_1$ through $f_L$, which are associated with the channel memory of the discrete time filter modeling the communication channel illustrated in FIG. 8. It should be noted that K may assume a zero value, in which case all tap coefficients are referred to as tap selectable.

TABLE 1

| Coefficient Classification | Processing Means |
|---|---|
| NON-SELECTABLE TAP COEFFICIENTS<br>Coefficients 1 through K<br>Set N = $\{f_1,...,f_K\}$, $|N|$ = K | Tap-selectable<br>Reduced state sequence estimation<br>(i.e., TS-RSSE 608) |
| MORE SIGNIFICANT SELECTABLE TAP COEFFICIENTS<br>V coefficients<br>(representing those coefficients selected by the tap selector from those coefficients with index k + 1 through L)<br>set A = $\{fi_j | fi_j \in S\hat{}\ (1 \leq j \leq V)\}$, $|A|$ = V | Tap-selectable<br>Reduced state sequence estimation<br>(i.e., TS-RSSE 608) |
| LESS SIGNIFICANT SELECTABLE TAP COEFFICIENTS<br>L−(K + V) Coefficients<br>(representing those coefficients not selected by the tap selector from those coefficients with index k + 1 through L)<br>set B = S\A, $|B|$ = L − K − V | Tap-selectable<br>Decision feedback prefilter<br>(i.e., TS-DFP 604) |

Note: Set S defines the set of selectable coefficients, equal to the union of sets B and A.

Referring to FIG. 6, upon selecting the V more significant coefficients from set S, the tap selector 606 outputs L−K control signals $\{s_i\}$, $K+1 \leq i \leq L$. Those control signals which correspond to the V more significant selectable coefficients (set A), identified by the tap selector 606, will be assigned an identifying control signal value. Similarly, those control signals which correspond to the (L−(K+V) less significant selectable channel tap coefficients (set B) will be assigned an identifying control signal value.

In one embodiment, the control signals corresponding to the V more significant selectable channel tap coefficients (set A) are assigned a value of 1, while the control signals corresponding to the L−(V+K) non-significant selectable channel tap coefficients (set B) are assigned a control signal value of 0, defined as $$f_i \in A \rightarrow s_i = 1$$
$$f_i \in B \rightarrow s_i = 0 \quad (2)$$

According to one aspect of the present invention, the channel coefficients may be analyzed by the tap selector 606 periodically or according to different specified criteria. For example, in a packet based system, often employed in wireless applications, the tap selector 606 might analyze the L−K selectable channel coefficients (set S) at the beginning of each received packet.

Referring to FIG. 6, the tap selector 606 analyzes the selectable L−K channel tap coefficients $\{f_i\}$, $K+1 \leq i \leq L$, (i.e., set S) to select V tap coefficients according to a predetermined criteria. In one embodiment, V tap coefficients are selected as those having the largest relative squared or absolute value from among the selectable L−K channel tap coefficients (set S) as defined by:

$$f_i \in A \hat{} f_j \in B \rightarrow |f_i| > |f_j| \quad (3)$$

Figure 9A:
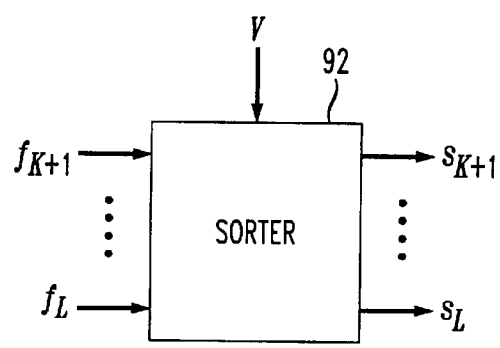
FIGS. 9a–9c are schematic block diagrams which illustrate three embodiments for selecting channel coefficients by the tap selector.

FIG. 9a illustrates a hardware embodiment of the present invention corresponding to equation (3) for finding the V more significant tap coefficients (set A). The sorter 92 prioritizes the channel coefficients in descending absolute or squared value at its output to facilitate selection of the V most significant coefficients.

A variation of selecting a predetermined number of tap coefficients, V, as described above would be to sum the absolute values of $f_i \in A$ in decreasing absolute value order until a predetermined threshold E is met, once the threshold is met, the number of tap coefficients included in the sum determines the value V. The threshold criteria is expressed as:

$$\sum_{j=1}^{V} |f_{i_j}| > E \quad (4)$$

A further variation of the embodiment expressed by equation (3) would be to sum the absolute values of $f_i \in N$ and those $f_{i_j} \in A$ such that the following condition is met:

$$\frac{\sum_{i=1}^{K} |f_i| + \sum_{j=1}^{V} |f_{i_j}|}{\sum_{i=1}^{L} |f_i|} > E \quad (5)$$

The $f_{i_j} \in A$ are evaluated in decreasing absolute value order for possible inclusion ins set A. The number of coefficients, $f_{i_j} \in A$, selected determines the value of V. The threshold criteria expressed by equation (5) states that the ratio of the sum of the non-selectable tap coefficients (set N), added to the sum of the more significant tap selectable coefficients (set A), which form the numerator, divided by the sum of all tap coefficients, must exceed a threshold ratio, E. The threshold ratio E could, for example, be set some fraction close to 1 (e.g., 0.95).

In an alternate embodiment, the V coefficients are determined by setting a general coefficient threshold T. Those channel coefficients exceeding the general coefficient threshold, T, are included as one of the V tap coefficients, defined by $$f_i \in S \hat{} |f_i| > T \rightarrow f_i \in A \quad (6)$$

Figure 9B:
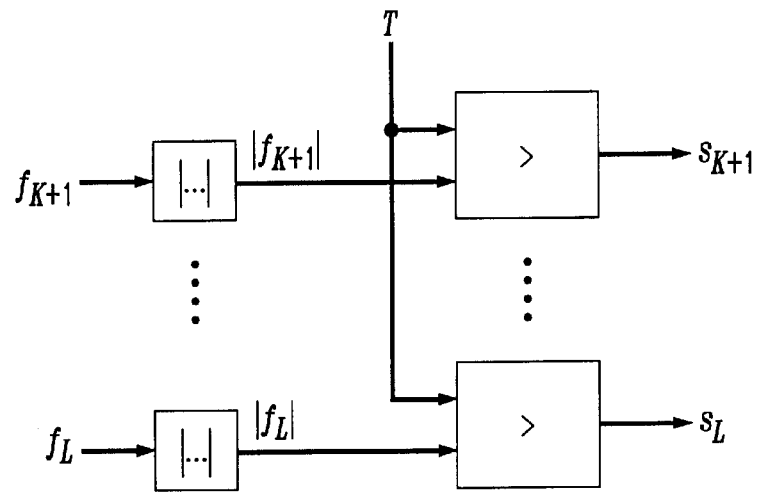

FIG. 9b illustrates a hardware implementation of equation (6). FIG. 9b illustrates that each coefficient is tested against the threshold T.

A further variation of equation (6) would be to choose the coefficient threshold T such that when the absolute values of those coefficients which exceed the coefficient threshold, $f_{i_j} \in A$ are summed such that the following condition is met $$\sum_{j=1}^{V} |f_{i_j}| > E \quad (7)$$

A further variation of equation (5) would be to choose T such that when the absolute values of $f_i \in N$ and those Fij, $f_{i_j} \in A$, which exceed T, are summed up, the following condition is met:

$$\frac{\sum_{l=1}^{K} |f_l| + \sum_{j=1}^{V} |f_{i_j}|}{\sum_{i=1}^{L} |f_i|} > E \quad (8)$$

In a further alternate embodiment, to determine the V more significant coefficients, the threshold method of the previously described embodiment is modified such that each coefficient has associated therewith a unique coefficient threshold $\{T_i\}$, $i \in [K+1, \ldots, L]$ for each selectable tap $f_i \in A$:

$$f_i \in S^\vee |f_i| > T_{i \to f_i \in A} \quad (9)$$

Figure 9C:
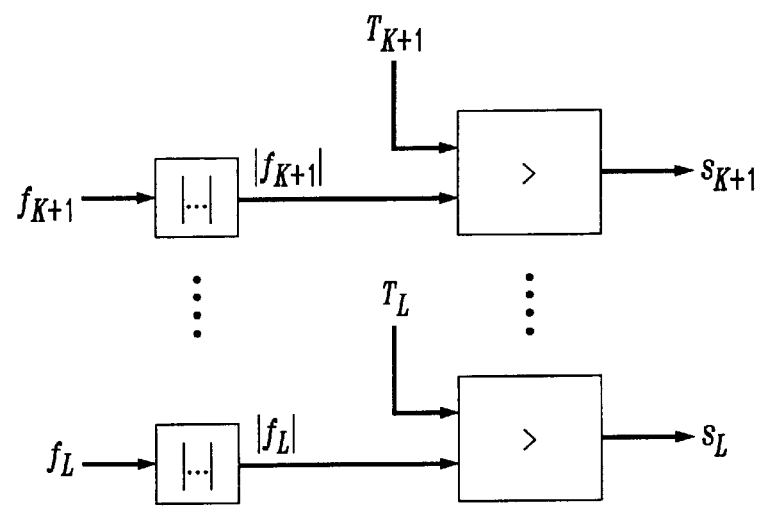

FIG. 9c illustrates a hardware implementation of equation (9). FIG. 9c illustrates that each coefficient is tested against its unique coefficient threshold, $T_{K+1}$ through $T_L$.

A variation of equation (9) would be to choose the respective coefficient thresholds $\{T_i\}$ such that when the absolute values of $f_{i_j} \in A$, which exceed their associated thresholds are summed up, the following condition is met:

$$\sum_{j=1}^{V} |f_{i_j}| > E \quad (10)$$

A further variation of equation (9) would be to choose the respective coefficient thresholds $\{T_i\}$ such that when the absolute values of $f_{i_j} \in A$, exceeding their associated threshold are summed up, the following condition is met:

$$\frac{\sum_{l=1}^{K} |f_l| + \sum_{j=1}^{V} |f_{i_j}|}{\sum_{i=1}^{L} |f_i|} > E \quad (11)$$

It should be noted that squared values may be substituted for absolute values as used throughout equations (3) through (11).

Figure 10:
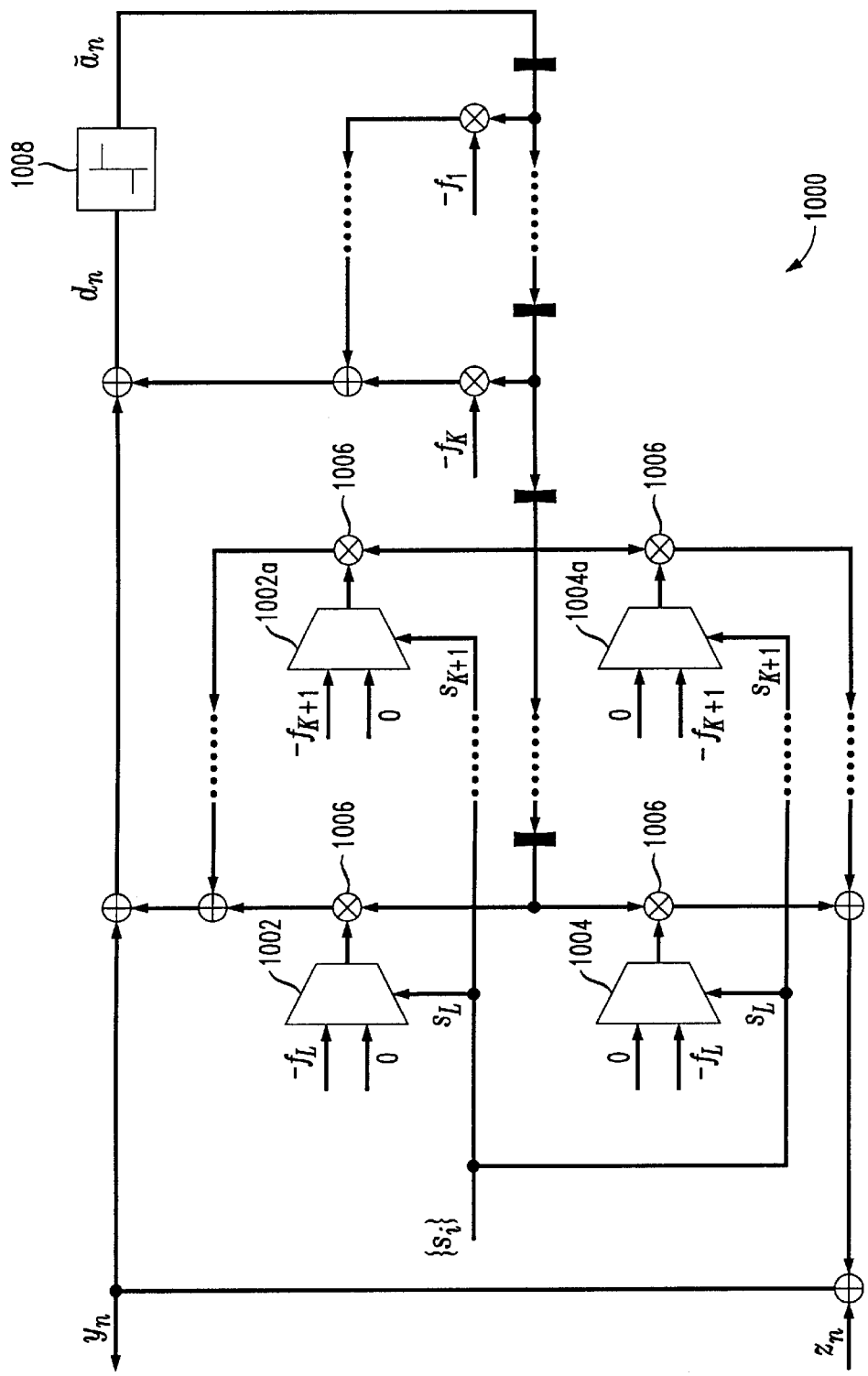
FIG. 10 illustrates one embodiment of a tap-selectable decision feedback pre-filter (TS-DFP) in accordance with the present invention.

FIG. 10 illustrates one embodiment of a tap-selectable decision feedback pre-filter (TS-DFP) 604 of FIG. 6, generally designated as reference numeral 1000, for processing the ISI due to the less significant selectable channel tap coefficients (set B). The embodiment of FIG. 10 is referred to as a flexible TS-DFP. It is referred to as a flexible TS-DFP because it reduces the ISI due to the L−(K+V) less significant selectable tap coefficients (set B), where the parameter V, which denotes the number of more significant selectable coefficients can assume any value in the range 0 to L−K. Referring now to FIG. 6, the TS-DFP 604 receives a copy of the L channel coefficients 610, $\{f_i\}$, $1 \leq i \leq L$, from the channel estimator 602. The TS-DFP 604 further receives as input L−K tap selector control signal outputs $\{s_i\}$, $K+1 \leq i \leq L$, 612 from the tap selector 606.

The flexible TS-DFP 1000 of FIG. 10 cancels the intersymbol interference from the less significant selectable channel tap coefficients (set B) such that the input to the TS-RSSE 608 is $$y_n = z_n - \sum_{i=K+1}^{L} \bar{s}_i f_i \check{a}_{n-i} \quad (12)$$

where $\bar{s}_i$ is the negation of $s_i$ (see Eq. 2) and $\check{a}_n$ is a tentative decision for data symbols an-i. The tentative decision $\check{a}_n$ is obtained by slicing $d_n$ by slicer 1008, which may be embodied as a hard decision or soft decision slicer, defined as $$d_n = z_n - \sum_{i=1}^{L} f_i \check{a}_{n-i}. \quad (13)$$

The flexible TS-DFP 1000 of the embodiment illustrated in FIG. 10 differs from a conventional decision feedback equalizer (DFE) in that its filter taps 1006 are selectable via multiplexors 1002 and 1004 so that only the ISI terms from the less significant selectable coefficients (set B) are selected for cancellation from the channel output $z_n$ 508 to form the TS-DFP output $y_n$.

FIG. 10 shows two sets of multiplexers 1002 and 1004, where each multiplexer pair (e.g., 1002a and 1004a) corresponds to one of the respective tap-selectable tap coefficients $f_i$, $i \in [K+1, \ldots, L]$. Effectively, only one multiplexer of each respective pair 1002a 1004a outputs a non-zero value at any one time in accordance with the associated tap control signal $s_i$, defined by equation 2. For example, a positive tap control signal (See eq. 2) would cause each multiplexer of the respective pairs to output the upper input value. For each multiplexer pair of FIG. 10, a zero will be output from one multiplexer and a tap-selectable tap coefficient value will be output from the other multiplexer. Those multiplexers in the bottom row of the pair which output non-zero values in the TS-DFP 1000, correspond to the (L−(K+V)) less significant selectable coefficients (set B), as determined by the tap selector signal analysis which analyzes coefficients $\{f_i\}$, $i \in [K+1, \ldots, L]$. It is therefore shown, by way of Equations (12) and (13), that the combination of multiplexors and associated tap control signals enable the adaptive selection of those coefficients determined to be less significant for processing their ISI by TS-DFP 1000 to form the output $y_n$.

Figure 11:
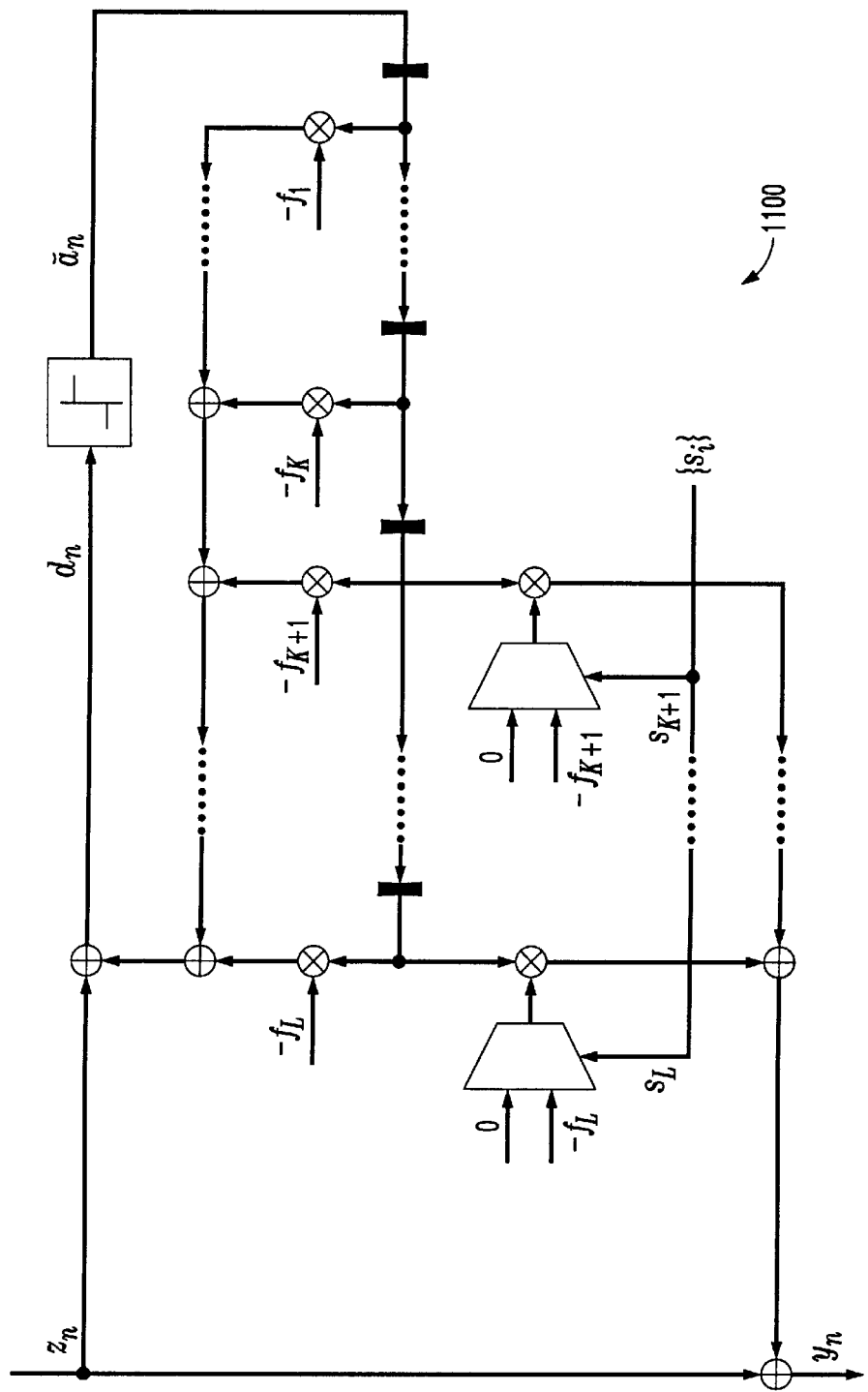
FIG. 11 illustrates a second embodiment of a tap-selectable decision feedback pre-filter (TS-DFP) in accordance with the present invention.

FIG. 11 illustrates another embodiment of a tap-selectable decision feedback pre-filter (TS-DFP) 604 of FIG. 6, generally designated as reference numeral 1100, for processing the ISI due to the less significant selectable channel coefficients (set B). The embodiment illustrated in FIG. 11 is referred to as a modified flexible tap-selectable decision feedback pre-filter (DFP). The embodiment of FIG. 11 is a modified version of FIG. 10 which similarly computes equations (12) and (13).

Figure 12:
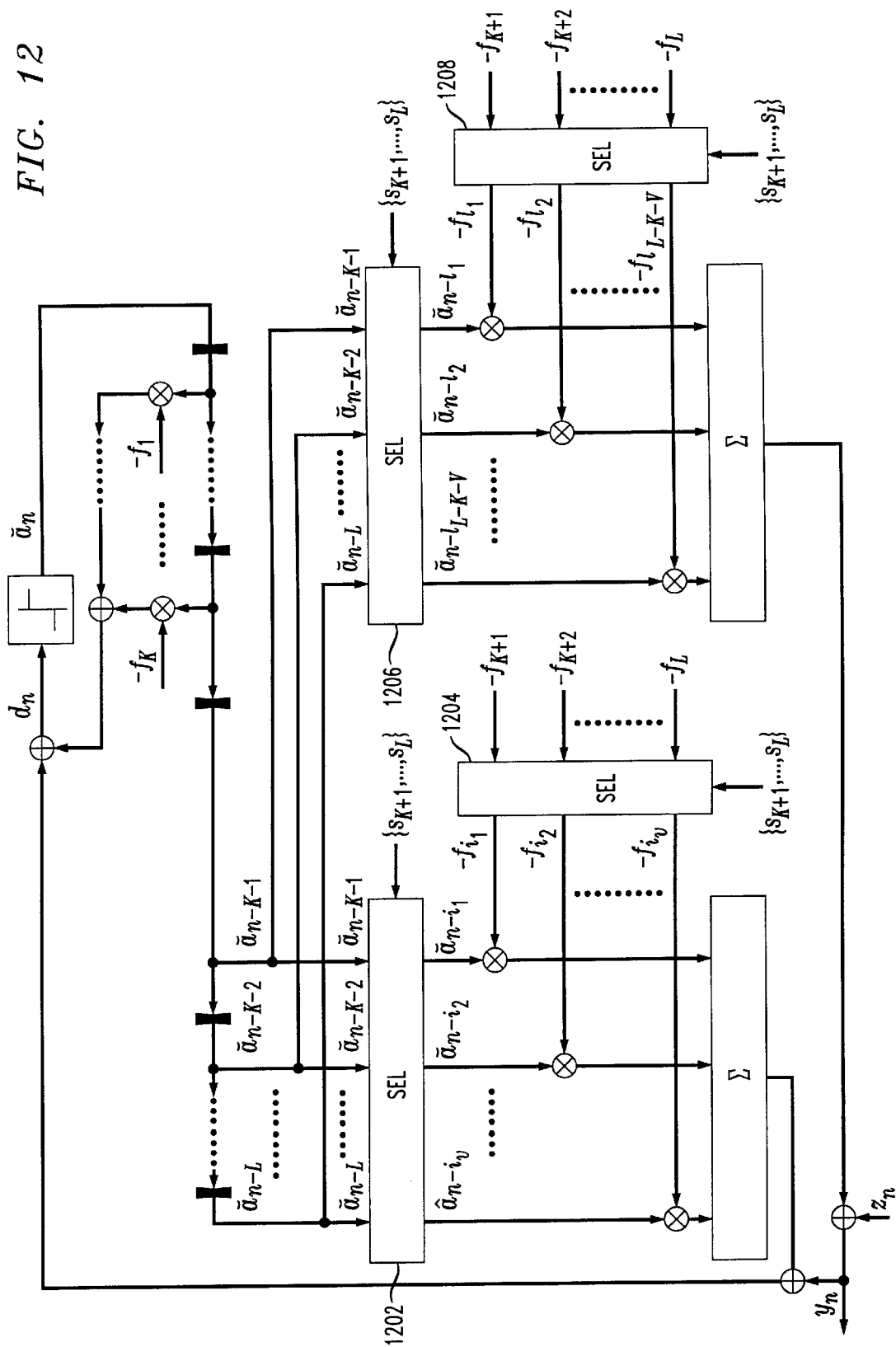
FIG. 12 illustrates a third embodiment of a tap-selectable decision feedback pre-filter (TS-DFP) in accordance with the present invention.

FIG. 12 illustrates another embodiment of a tap-selectable decision feedback pre-filter (TS-DFP) 604 of FIG. 6, generally designated as reference numeral 1200, for processing the ISI due to the L−(K+V) less significant selectable channel coefficients (set B). The embodiment illustrated in FIG. 12 is referred to as a minimum area tap-selectable decision feedback pre-filter (DFP). The embodiment of FIG. 12 is a modified version of FIG. 10 which similarly computes equations (12) and (13).

As distinguished from the embodiment illustrated in FIGS. 10 and 11 which utilize multiplexers 1002 and 1004 to select channel coefficients, the present embodiment, as illustrated in FIG. 12 utilizes selectors 1202, 1204, 1206, and 1208 instead of multiplexers. Selector 1204 selects V channel tap coefficients, set (A), at its respective output from L−K input channel tap coefficients (set S). Selector 1202 selects V symbols which correspond to the more significant selectable channel coefficients (set A) at its respective output from L−K symbols which correspond to the selectable channel coefficients (set S). Selector 1208 selects the L−(K+V) less significant selectable coefficients (set B) at its respective output from the L−K selectable channel coefficients (set S). Selector 1206 selects L−(K+V) symbols (set B), which correspond to the less significant selectable channel coefficients at its respective output from the L−K symbols which correspond to the selectable channel coefficient (set S).

Figure 13:
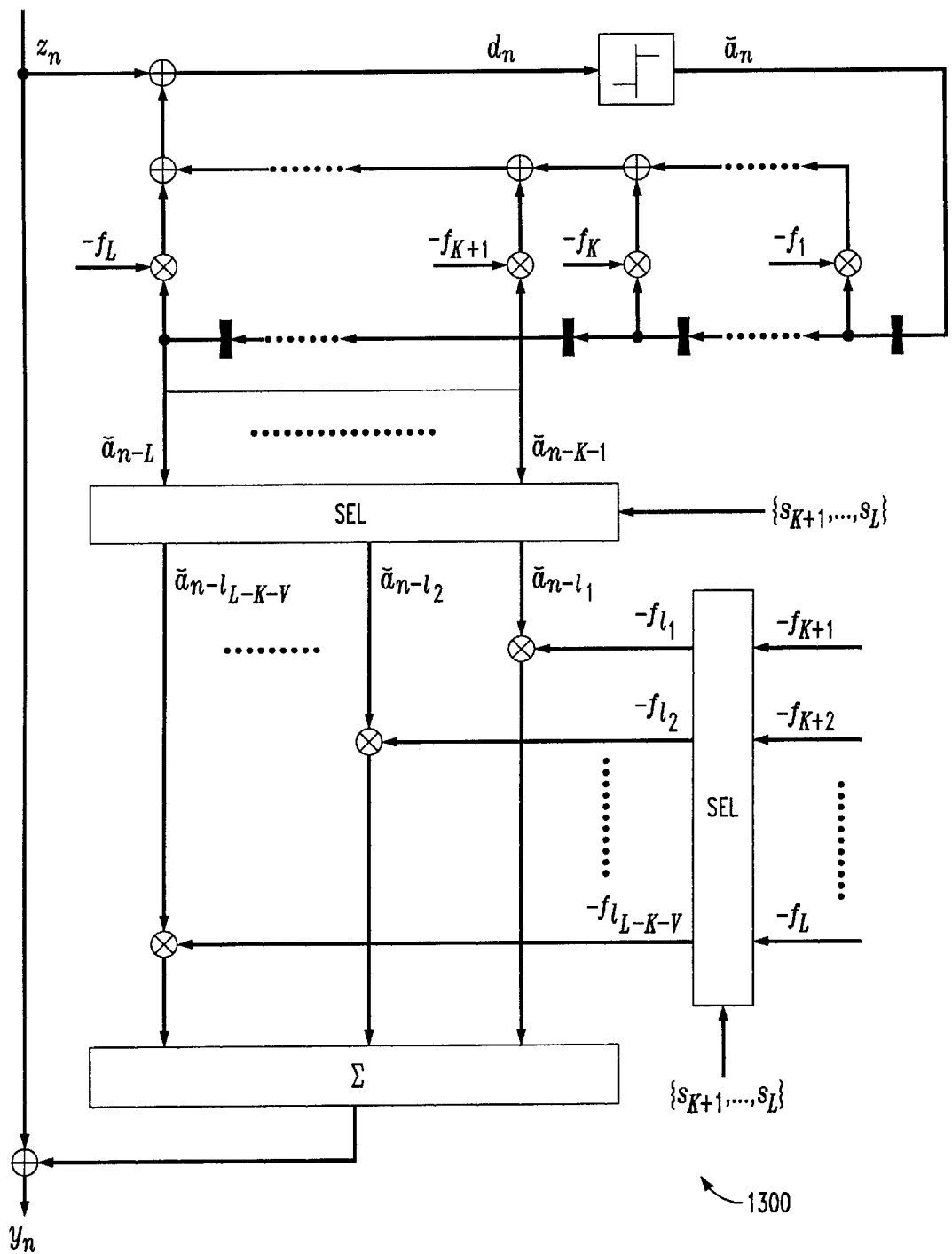
FIG. 13 illustrates a fourth embodiment of a tap-selectable decision feedback pre-filter (TS-DFP) in accordance with the present invention.

FIG. 13 illustrates another embodiment of a tap-selectable decision feedback pre-filter (TS-DFP) 604 of FIG. 6, generally designated as reference numeral 1300, for processing the ISI due to the (L−(K+V) less significant channel coefficients (set B). The embodiment illustrated in FIG. 13 is referred to as a modified minimum area tap-selectable decision feedback pre-filter (DFP). The embodiment of FIG. 13 is a variation of the embodiment of FIG. 12 which similarly computes equations (12) and (13).

Figure 14:
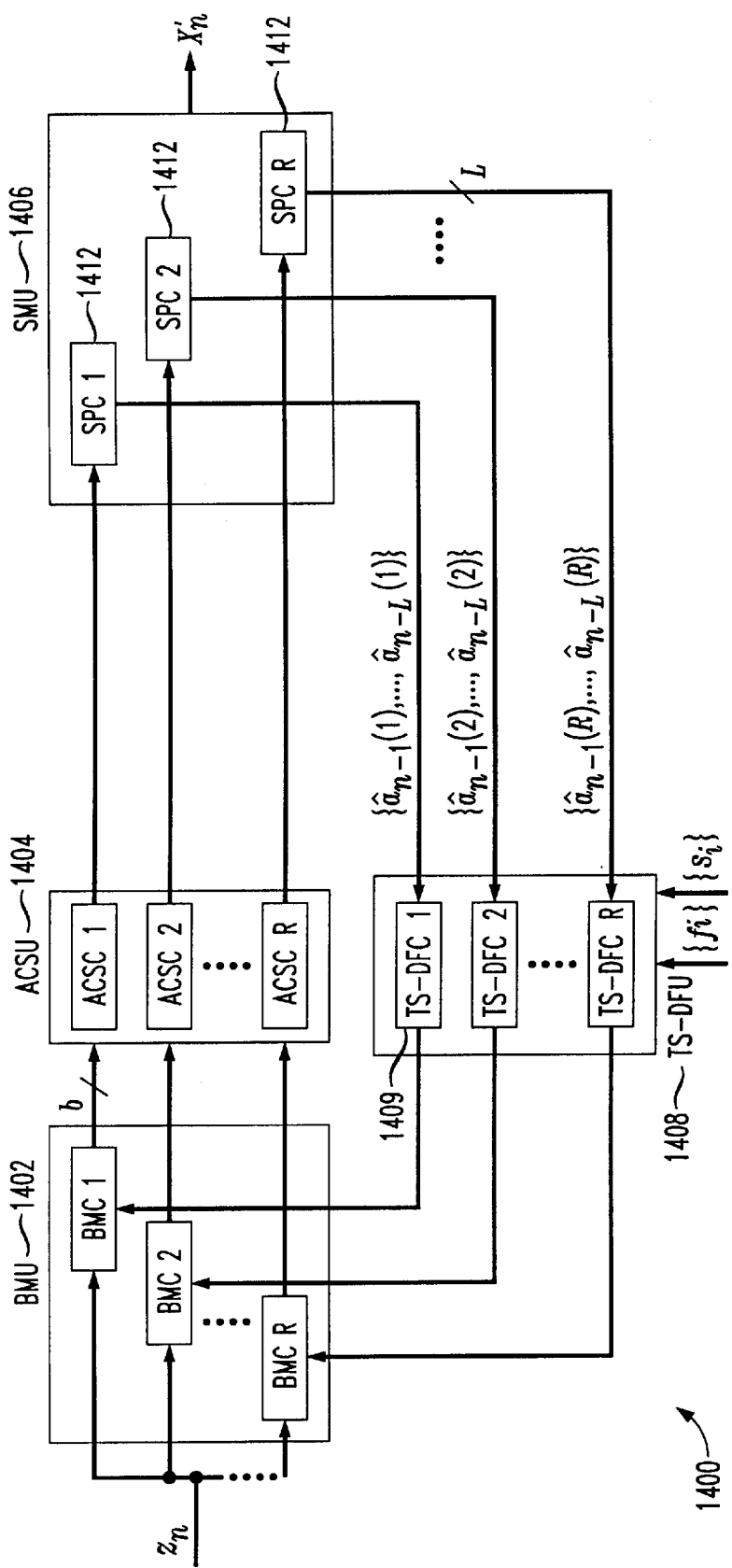
FIG. 14 is a block diagram of a tap-selectable RSSE equalizer/decoder (TS-RSSE) in accordance with the present invention.

FIG. 14 illustrates an embodiment of the tap selectable reduced state sequence estimator (TS-RSSE) 608 of FIG. 6 designated generally by reference numeral 1400. TS-RSSE 1400 utilizes a reduced state sequence estimation (RSSE) technique to process the ISI due to both the first K tap coefficients (i.e., set N, the non-selectable taps) of the channel impulse response and the V more significant selectable tap coefficients (set A) adaptively selected at each selection interval by the tap selector 606.

The TS-RSSE 1400 of FIG. 14 includes a branch metric unit (BMU) 1402 for calculating the metrics for the transitions from the R states, where R is the number of reduced states. Each branch metric cell (BMC) calculates the b=$2^{m'}$ metrics for the b transitions leaving a particular state. The branch metric for reduced state $\tau_n$ under input $a_n$ is given by $$\lambda_n(z_n, a_n, \tau_n) = (z_n - a_n - x_n(\tau_n))^2 \qquad (14)$$

In the above equation, $x_n(\tau_n)$ is the ISI estimate for state $\tau_n$ and calculated as $$x_n(\tau_n) = u_n(\tau_n) + v_n(\tau_n) \qquad (15)$$

where $u_n(\tau_n)$ is calculated as $$u_n(\tau_n) = \sum_{j=1}^{K} f_j \hat{a}_{n-j}(\tau_n) \qquad (16)$$

and $v_n(\tau_n)$ can be either calculated as $$v_n(\tau_n) = \sum_{j=1}^{j=V} f_{i_j} \hat{a}_{n-i_j}(\tau_n) \qquad (17)$$

or, equivalently as $$v_n(\tau_n) = \sum_{i=K+1}^{L} s_i f_i \hat{a}_{n-i}(\tau_n). \qquad (18)$$

Figure 16:
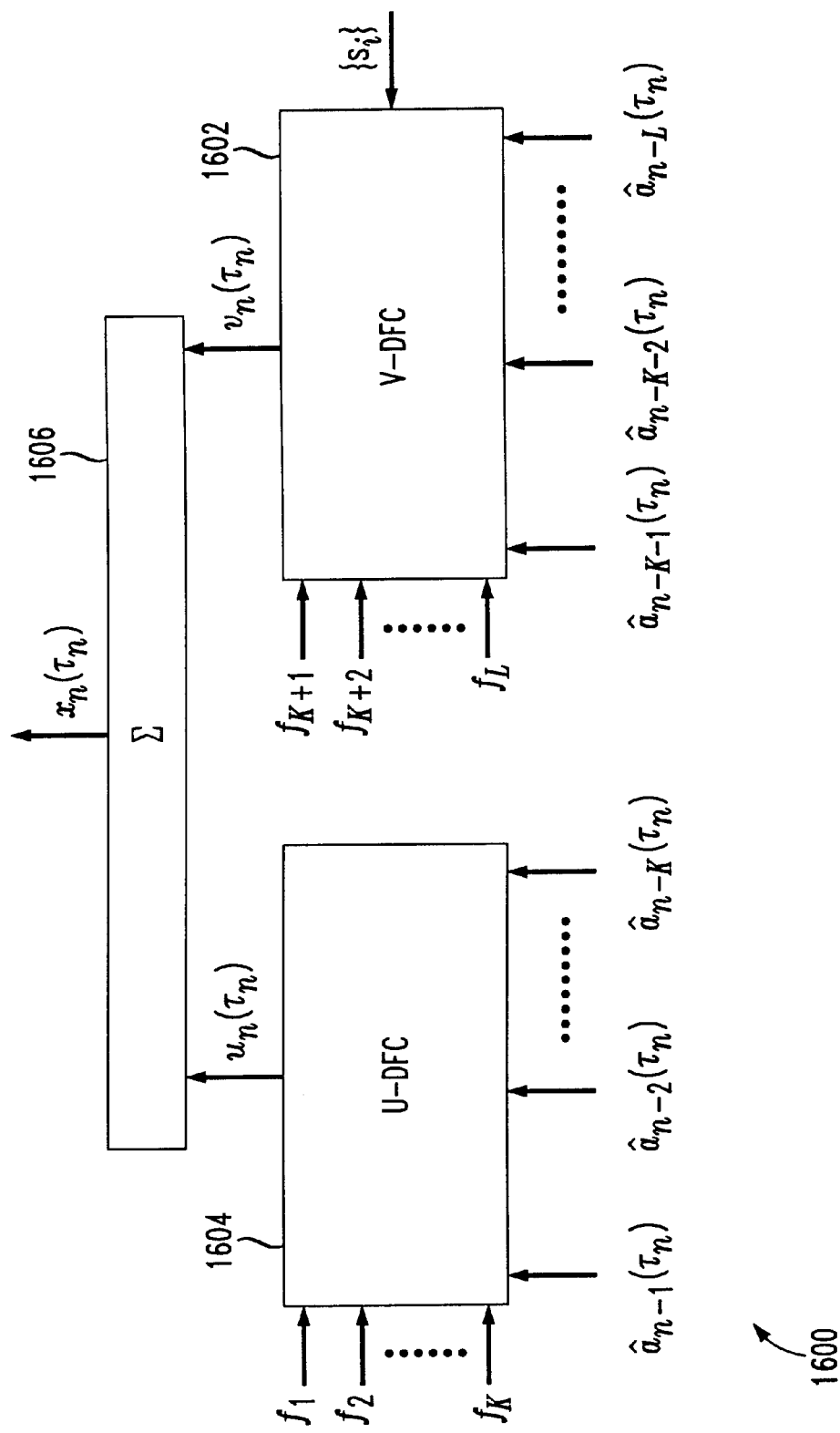
FIG. 16 is an illustration of a TS-DFC cell of FIG. 14.

In the above equations, $\hat{a}_{n-i}(\tau_n)$ is the survivor symbol corresponding to the data symbol $a_{n-i}$, from the survivor path into state $\tau_n$. An ISI estimate $x_n(\tau_n)$ is calculated for each of the R states by taking the survivor symbols of the corresponding survivor path as tentative decisions. The calculation of $x_n(\tau_n)$ according to (15) for a particular state is performed in the TS-DFC 1409, which is shown in FIG. 16.

The surviving paths into each state are determined in the add-compare-select cells. (ACSC) of the add-compare-select unit (ACSU) 1404. Among all b paths entering state $r_{n+1}$ from predecessor states $\{\tau_n\}$, the most likely path is chosen according to following path metric calculation referred to as add-compare-select:

$$\Gamma_{n+1}(\tau_{n+1}) = \min_{\{\tau_n\} \to \tau_{n+1}} (\Gamma_n(\tau_n) + \lambda_n(z_n, a_n, \tau_n)) \qquad (19)$$

The R paths with the surviving symbols are stored in the corresponding survivor path cells (SPCs) of the survivor memory unit (SMU) 1406. R soft output values are computed by the decision feedback cells (DFCs) 1409 in the decision feedback unit (DFU) 1408 based on the survivors in the SMU 1406.

Figure 15:
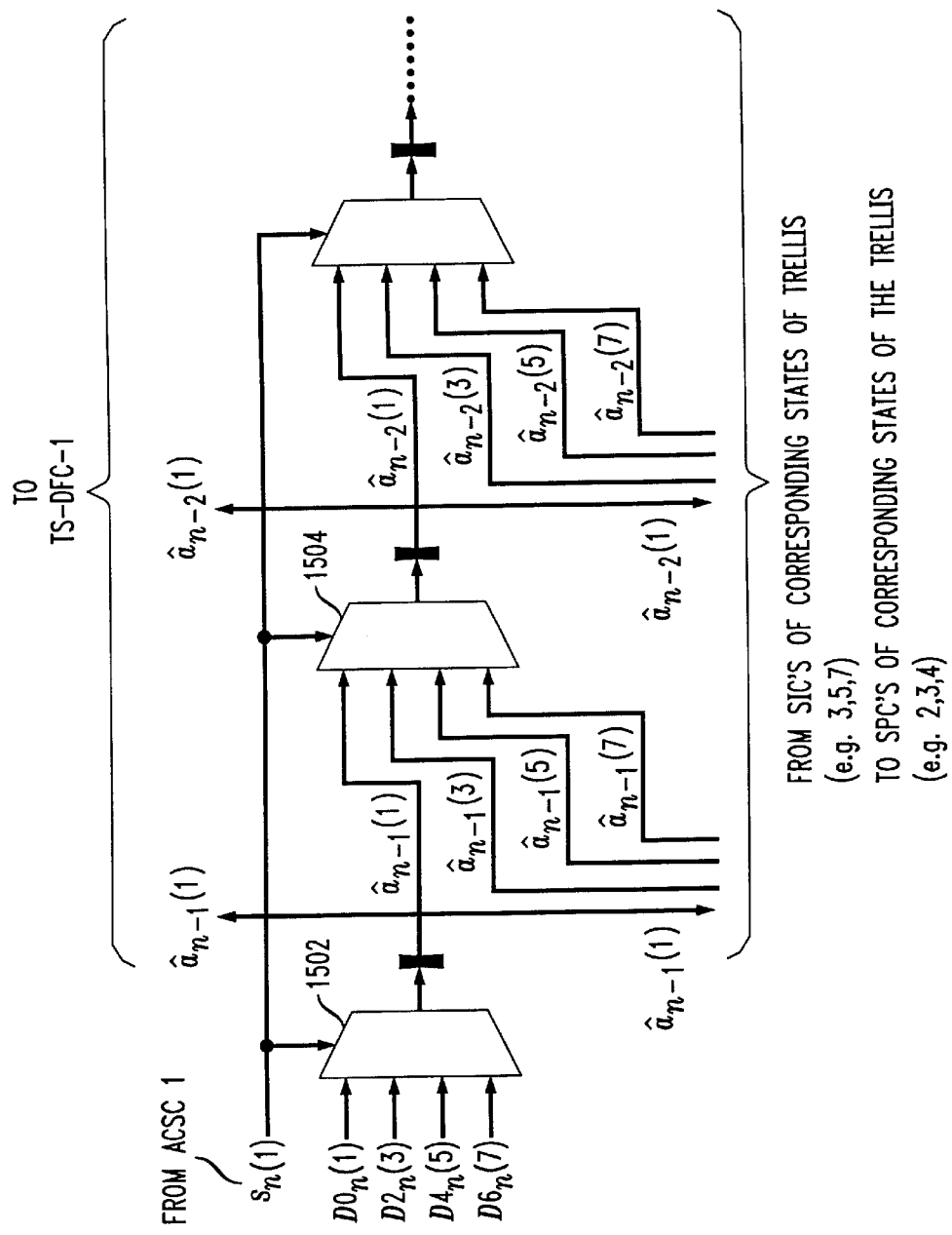
FIG. 15 is an illustration of one of the SPC cells corresponding to state 1 of FIG. 7 of the SMU of FIG. 14.

FIG. 15 is an illustration of one of the SPC cells 1412 of the SMU 1406 of FIG. 14, SPC 1, corresponding to state 1 of the trellis shown in FIG. 7. A register exchange architecture is assumed where for each state and trellis stage a multiplexer selects a symbol which corresponds to the survivor path. For a more detailed explanation of a register exchange architecture for a survivor memory unit see R. Cypher and C. B. Shung, "Generalized trace-back techniques for survivor memory management in the Viterbi algorithm," Journal of VLSI Signal Processing, vol. 5, pp. 85–94, 1993. FIG. 15 illustrates multiplexer 1502 which selects at each stage the current symbol corresponding to the survivor path into state 1. FIG. 15 also illustrates multiplexers 1504 which select at each stage a previous symbol corresponding to the survivor path into state 1. The candidate symbols are selected from survivor symbols stored in SPC cells 1, 3, 5, and 7. The survivor sequence stored in SPC cell 1 is sent to the TS-DFC cell 1 to calculate an ISI estimate according to equations (15), (16), and (17) or (18).

FIG. 16 illustrates a general block diagram of a TS-DFC cell 1409 of FIG. 14 in accordance with the present invention. As shown in FIG. 16, the TS-DFC cell 1409 of FIG. 14 is made up of a U-DFC cell 1604 and a V-DFC unit 1602. An ISI estimate is calculated by the U-DFC 804 for the first K taps, $\{f_i\}$, $1 \leq i \leq K$, (set N) as illustrated by equation (16). The V-DFC cell of FIG. 16 calculates an ISI estimate for the V channel tap coefficients, set A, as illustrated by equation (17) or (18), which have been selected by the tap selector 606 from among the selectable channel coefficients (set S). The results of equations (16) and (17) or (18) are summed in the summer 1606 of the TS-DFC 1606 to produce an ISI estimate for each of the R states at each discrete time interval.

Figure 17:
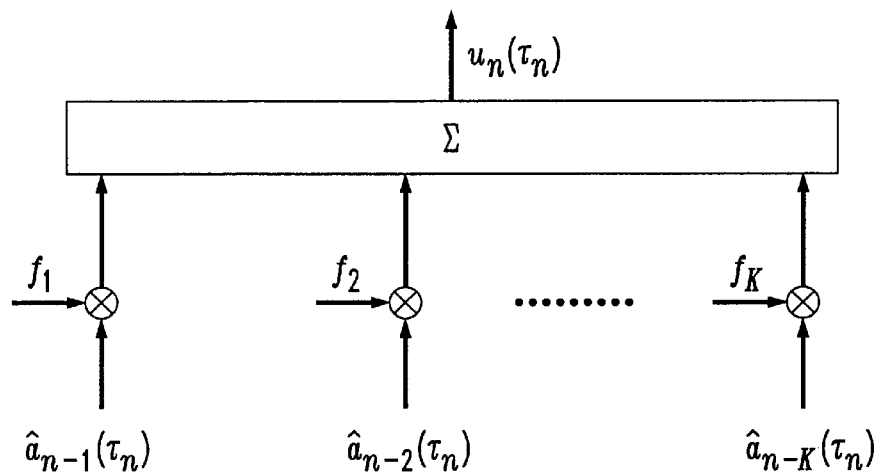
FIG. 17 is an illustration of a U-DFC cell of FIG. 16.

FIG. 17 illustrates one embodiment of a U-DFC cell of FIG. 16. The embodiment illustrated in FIG. 17 performs equation (16). The U-DFC cell calculates an ISI estimate for the first K non-selectable channel coefficients, $f_1$ through $f_K$, (set N).

Figure 18:
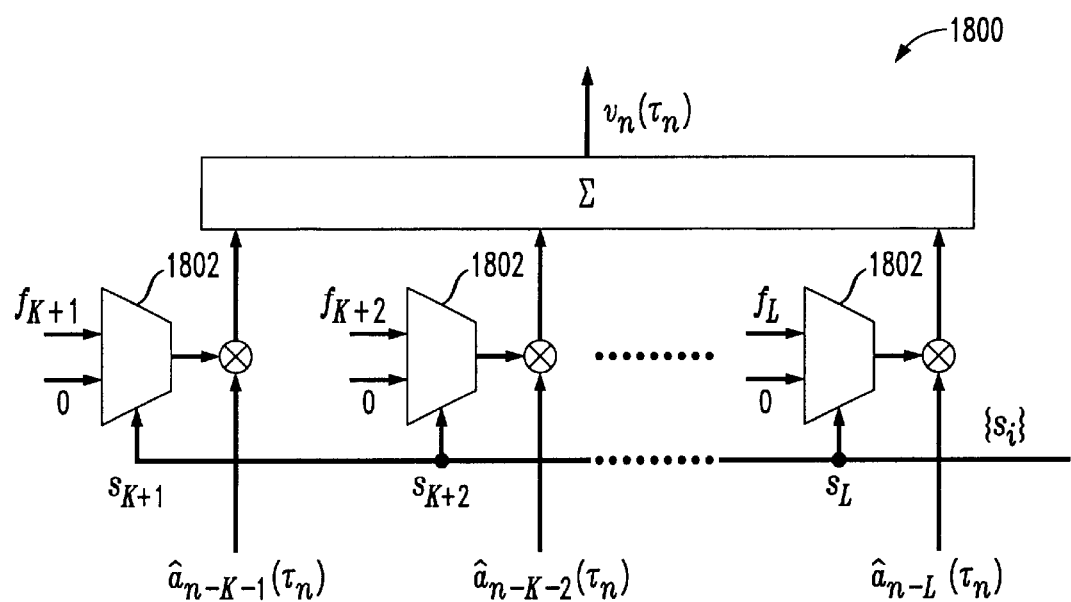
FIG. 18 is an embodiment of a V-DFC cell of FIG. 16 in accordance with the present invention.

FIG. 18 illustrates an embodiment of the V-DFC cell 1602 of FIG. 16, generally designated by the reference numeral 1800, referred to as a flexible architecture implementation. In the present embodiment, the parameter V can be adaptively set to take any value from 0 to L−K in accordance to changes of the channel characteristics. Here the V-DFC cell 1800 is implemented for all of the selectable channel taps (set S), $\{f_i\}$, $i\epsilon[K+1, \ldots, L]$. For each tap a multiplexer 1802 outputs a channel coefficient or a zero value depending on the control signal values $\{s_i\}$. The DFC 1800 calculates the ISI for the V more significant selectable channel coefficients (set A) using Equation (18).

Figure 19:
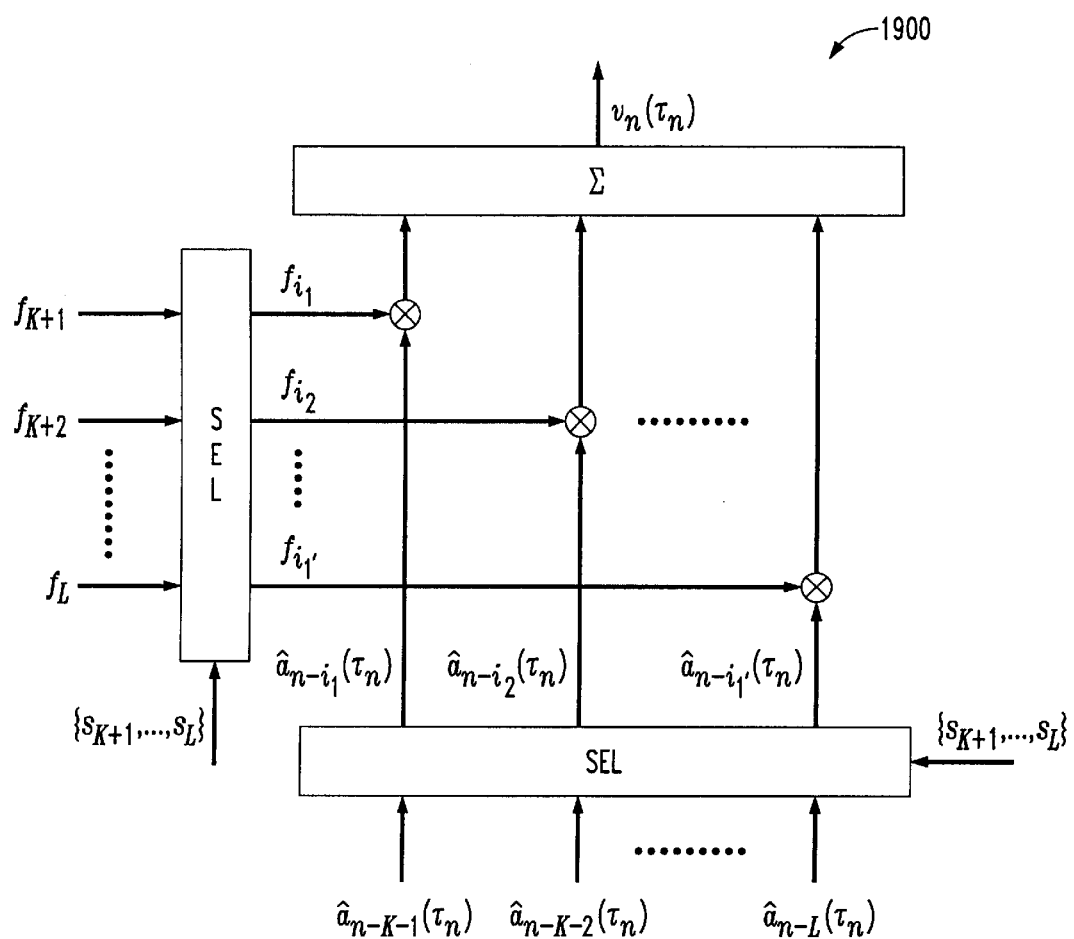
FIG. 19 is a second embodiment of a V-DFC cell of FIG. 16 in accordance with the present invention.

FIG. 19 illustrates an embodiment of a V-DFC cell 1602 of FIG. 16, referred to herein as a reduced area implementation 1900. The embodiment illustrated in FIG. 19 performs equation (17). It is a reduced area embodiment in that it accounts for only a fixed number, V, of significant selectable channel taps (set A) for a particular channel environment. That is, the value V is predetermined to be an integer less than or equal to L–K. It is noted that while the total number of significant selectable channel taps, V, are fixed, the indices $\{i_j\}$, $j\epsilon[1, \ldots, V]$, however, are not fixed and can be adaptively set during data detection depending on the analysis performed in the selector 606.

Figure 20:
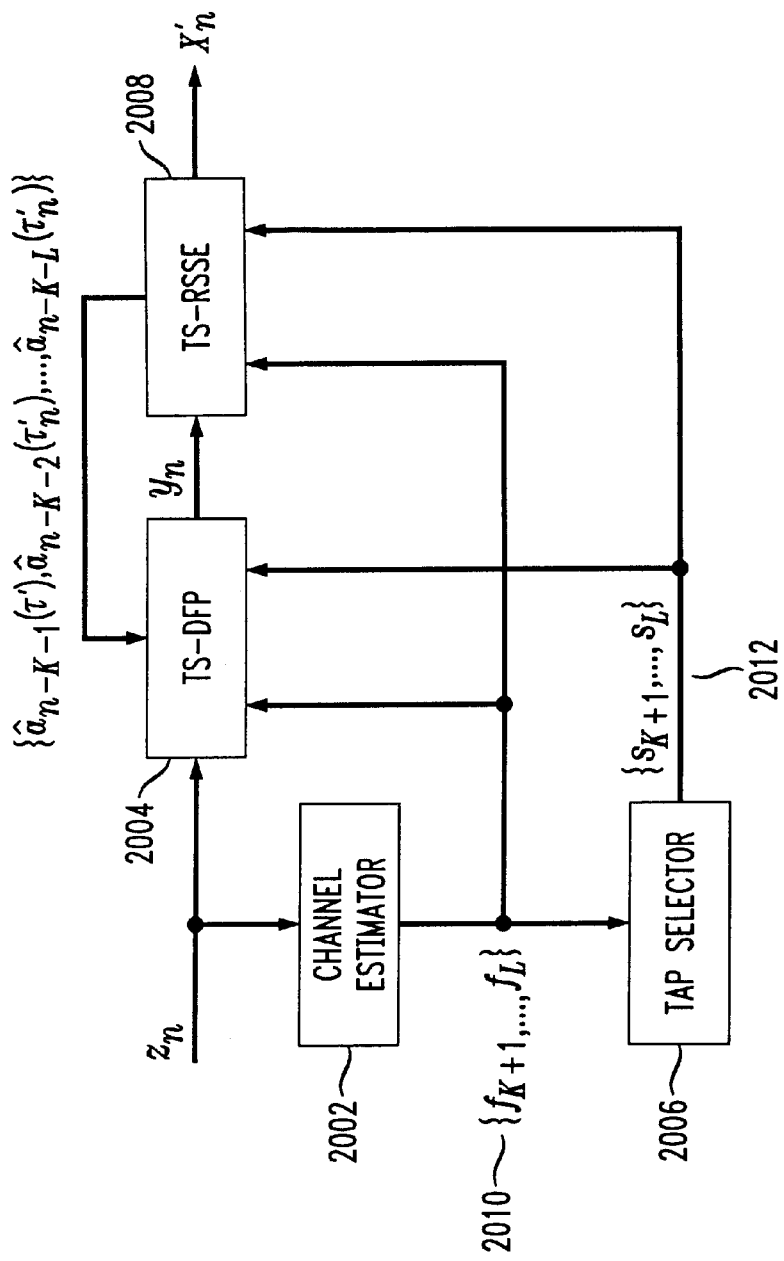
FIG. 20 is a second embodiment of a schematic block diagram of a tap selectable RSSE equalizer/decoder (TS-RSSE) with a tap selectable decision feedback prefilter (TS-DFP)
Figure 21:
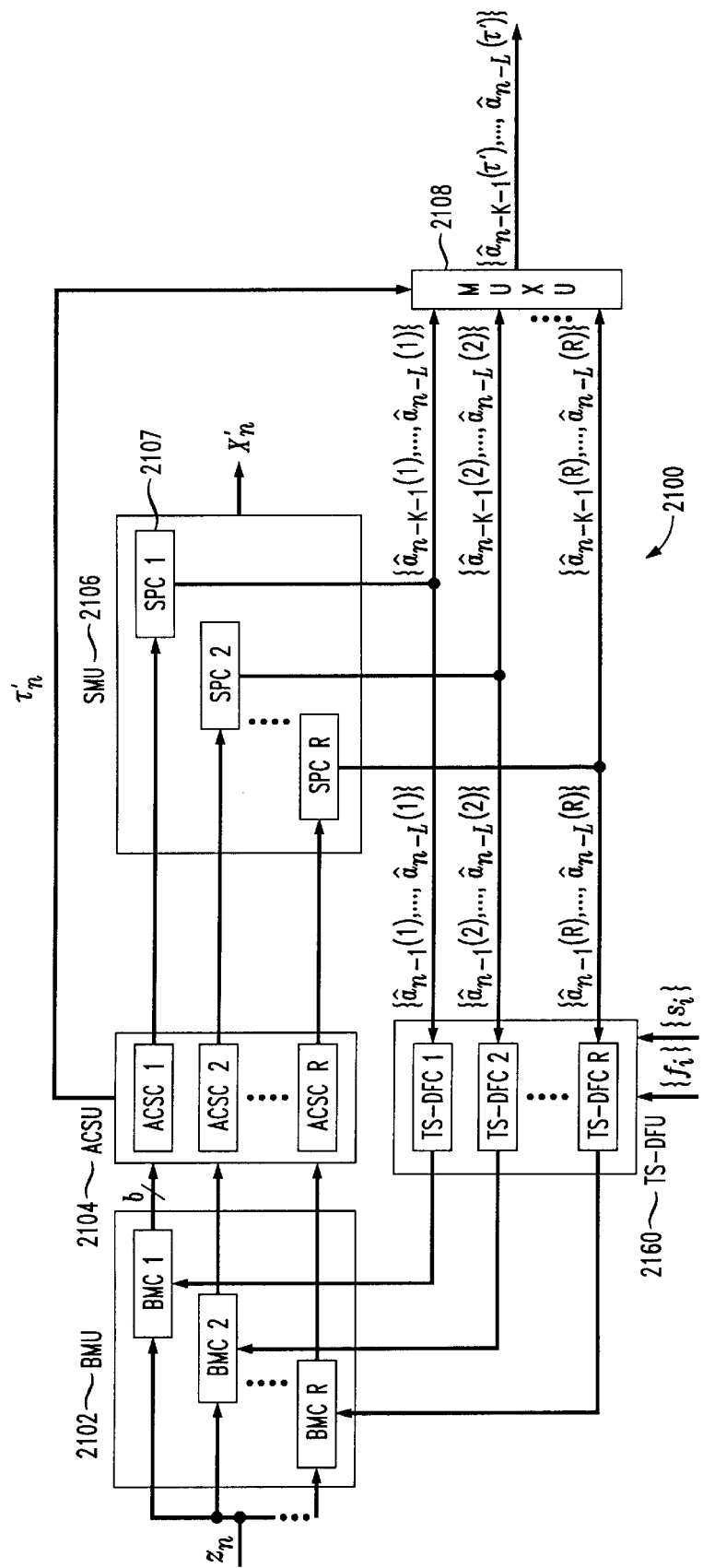
FIG. 21 is an embodiment of the tap-selectable TS-RSSE equalizer/decoder of FIG. 20.

FIG. 20 illustrates an alternate embodiment of a tap selectable TS-RSSE equalizer/decoder (TS-RSSE) with a tap selectable decision feedback prefilter (TS-DFP) 2004 in accordance with the present invention. FIG. 21 illustrates a detailed block diagram of a TS-RSSE in accordance with the present embodiment. As shown in FIG. 20, a feedback loop is shown directed from the TS-RSSE 2008 to the TS-DFP 2004. The feedback loop feeds back the best survivor path from the TS-RSSE 2008 to cancel the intersymbol interference caused by the less significant selectable channel tap coefficients (set B). By contrast, in the embodiment of FIG. 6, the intersymbol interference due to the less significant selectable channel coefficients is cancelled by using tentative decisions obtained in the TS-DFP structure.

FIG. 21 illustrates an embodiment of the TS-RSSE 2008 of FIG. 20. As shown in FIG. 21, the survivor symbols associated with each SPC cell (i.e. SPC 1 through R) 2207 of the SMU 2106 is output to the DFU 2110 and to MUXU 2108. The ACSU 2104 determines the state of the best path metric and feeds the state number to the MUXU 2108 to select the survivor sequence corresponding to the state with the best path metric (e.g., SPC cell output 1 or 2 or . . . R) to be fed back as tentative data symbols to the TS-DFP 2004 of FIG. 20.

Figure 22:
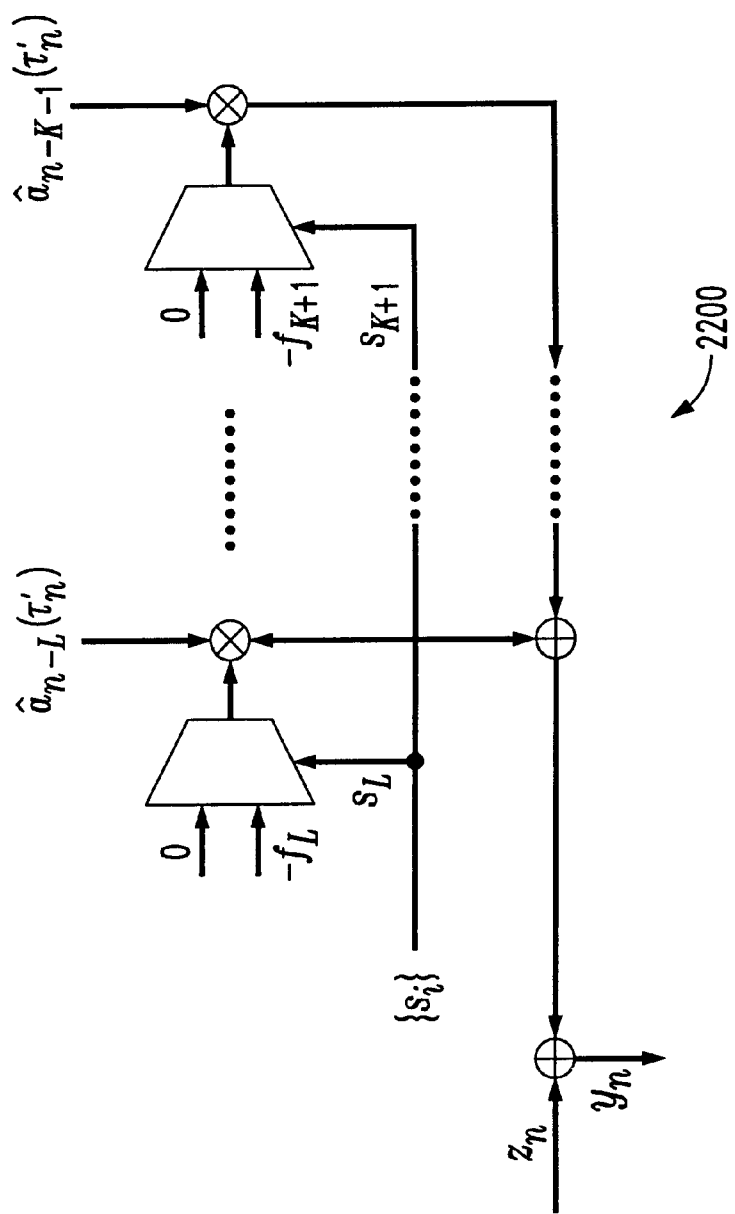
FIG. 22 is one embodiment of a tap-selectable DFP (TS-DFP) of FIG. 20.

FIG. 22 illustrates one embodiment of a tap-selectable decision feedback pre-filter (TS-DFP) 2004 of FIG. 20, generally designated as reference numeral 2200, for processing the ISI due to the less significant selectable channel tap coefficients (set B). The embodiment illustrated in FIG. 22 is referred to as a flexible tap-selectable decision feedback pre-filter (DFP). The embodiment of FIG. 22 computes equation (20):

$$y_n = z_n - \sum_{i=K+1}^{L} \bar{s}_i f_i \hat{a}_{n-i}(\tau'_n) \quad (20)$$

In this equation, $\hat{a}_{n-i}(\tau'_n)$ is the survivor symbol into the state $\tau'_n$ with the best path metric among all R states and it corresponds to data symbol $a_{n-i}$.

Figure 23:
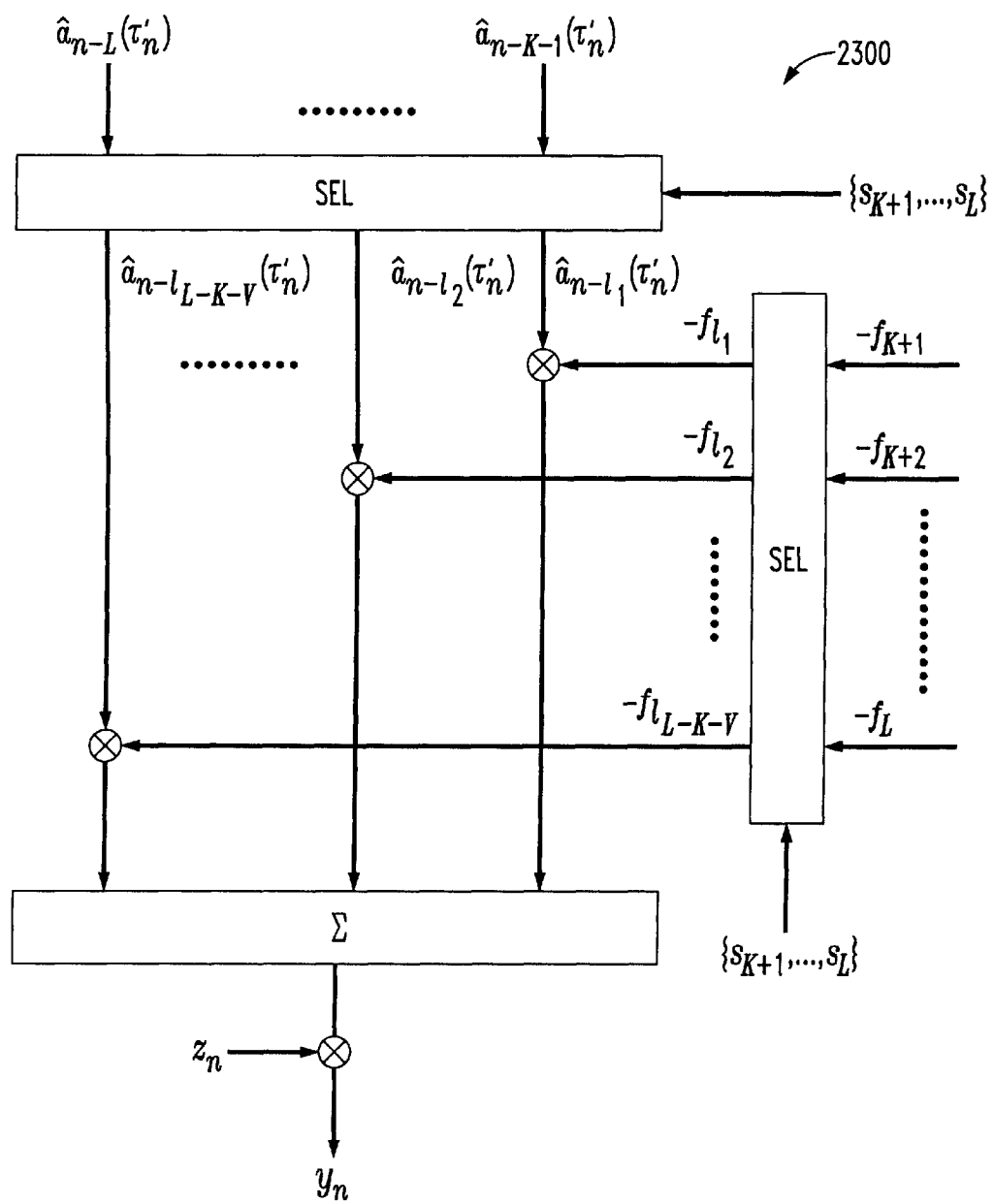

FIG. 23 illustrates another embodiment of a tap-selectable decision feedback pre-filter (TS-DFP) 2004 of FIG. 20, generally designated as reference numeral 2300, for processing the ISI due to the less significant selectable channel coefficients (set B). The embodiment illustrated in FIG. 23 is referred to as a minimum area tap-selectable decision feedback pre-filter (DFP). The embodiment of FIG. 23 computes equation (20).

Power Consumption

Figure 24:
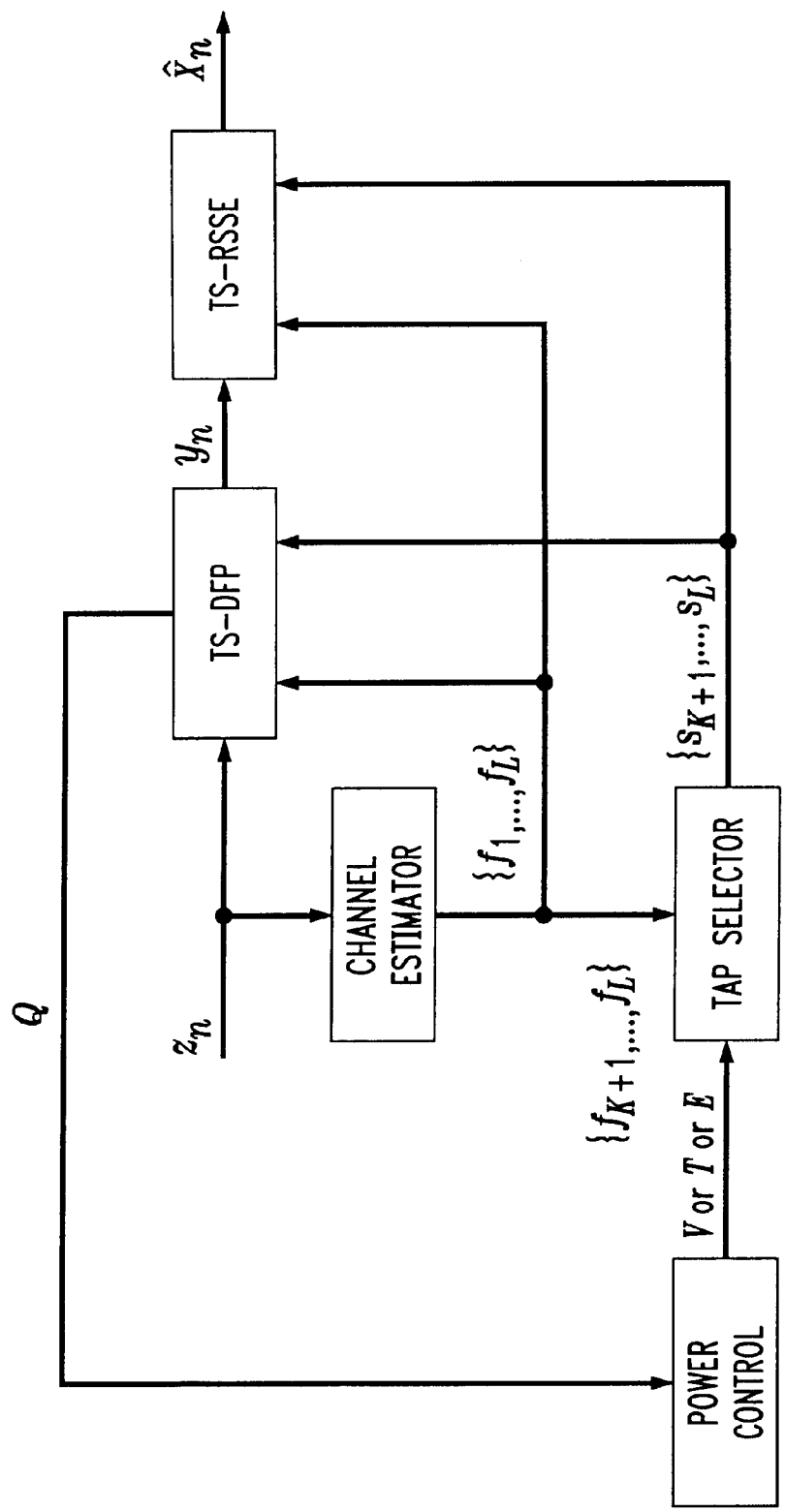
FIG. 24 is a schematic block diagram of a tap selectable RSSE equalizer/decoder (TS-RSSE) with a tap selectable decision feedback prefilter (TS-DFP) illustrating three embodiments of a method of power control.

According to another aspect of the present invention, reduced power consumption may be realized over prior art reduced complexity sequence estimators in accordance with three embodiments to be disclosed below. In each embodiment, a channel quality metric, Q, is measured. The channel quality metric is obtained from either the TS-RSSE, the channel estimator, or the TS-DFP. The channel quality metric selected can be, for example, the bit error rate BER, the signal to noise ratio (SNR), the mean squared error, or the path metric if the state with the best path metric. The present invention also contemplates the use of other channel quality metrics not explicitly disclosed above. FIG. 24 illustrates each of the three respective embodiments for determining the number of coefficients to be processed in the tap selectable reduced state sequence estimator TS-RSSE 608 to achieve reduced power consumption. Specifically, FIG. 24 illustrates the variable V for use in a first embodiment, the variable T for use in the second embodiment, and the variable E for use in the third embodiment. In the three embodiments of FIG. 24, Q is obtained from the TS-DFP as an example.

In operation, the channel quality metric chosen, Q, is measured and compared against a quality threshold (not shown) to make a channel quality determination(i.e., high or low). The following table illustrates how the variables V, T, and E, representing the respective embodiments, are adjusted in accordance with the comparison of the channel quality metric Q with the quality threshold, as indicated by column 1.

TABLE II

| Comparison of Q with quality threshold | Resulting Channel Quality Determination | Resulting Action for each embodiment |
|---|---|---|
| SNR > quality threshold<br>BER < quality threshold<br>Mean sq.error < quality threshold<br>Path metric < quality threshold | High quality channel | Decrease V, or<br>Increase threshold, T, or<br>Decrease threshold E |
| SNR < quality threshold<br>BER > quality threshold<br>Mean sq.error > quality threshold<br>Path metric > quality threshold | Low quality channel | Increase V, or<br>Decrease threshold, T, or<br>Increase threshold, E |

Referring to row 1 of Table II, satisfying any of the comparisons of column 1 of row 1 results in a high quality channel, as indicated in column 2. For the embodiment which describes adjusting the number of coefficients, V, to be processed in the tap selectable reduced state sequence estimator TS-RSSE 608 to achieve reduced power consumption, a high quality channel determination would result in a decrease in the value of V (i.e., less coefficients are selected). This is further illustrated in the apparatus illustrated in FIG. 9a.

In the second embodiment, which utilizes a coefficient threshold T, if the channel quality is determined to be high, the threshold T is increased (See FIG. 9b) thereby causing a decreased number of channel coefficients to be processed in the tap selectable reduced state sequence estimator TS-RSSE 608, and more coefficients are processed in the less power consumptive tap-selectable decision feedback prefilter TS-DFP 504. In the third embodiment, the threshold, E, is decreased causing a decreased number of channel coefficients to be processed in the tap selectable reduced state sequence estimator TS-RSSE 608, and more coefficients are processed in the less power consumptive tap-selectable decision feedback prefilter TS-DFP 504 (See equations 4 and 5).

The second row of Table II describes the case for a low quality channel which gives essentially an opposite result from that described above for a high quality channel.

Figure 25:
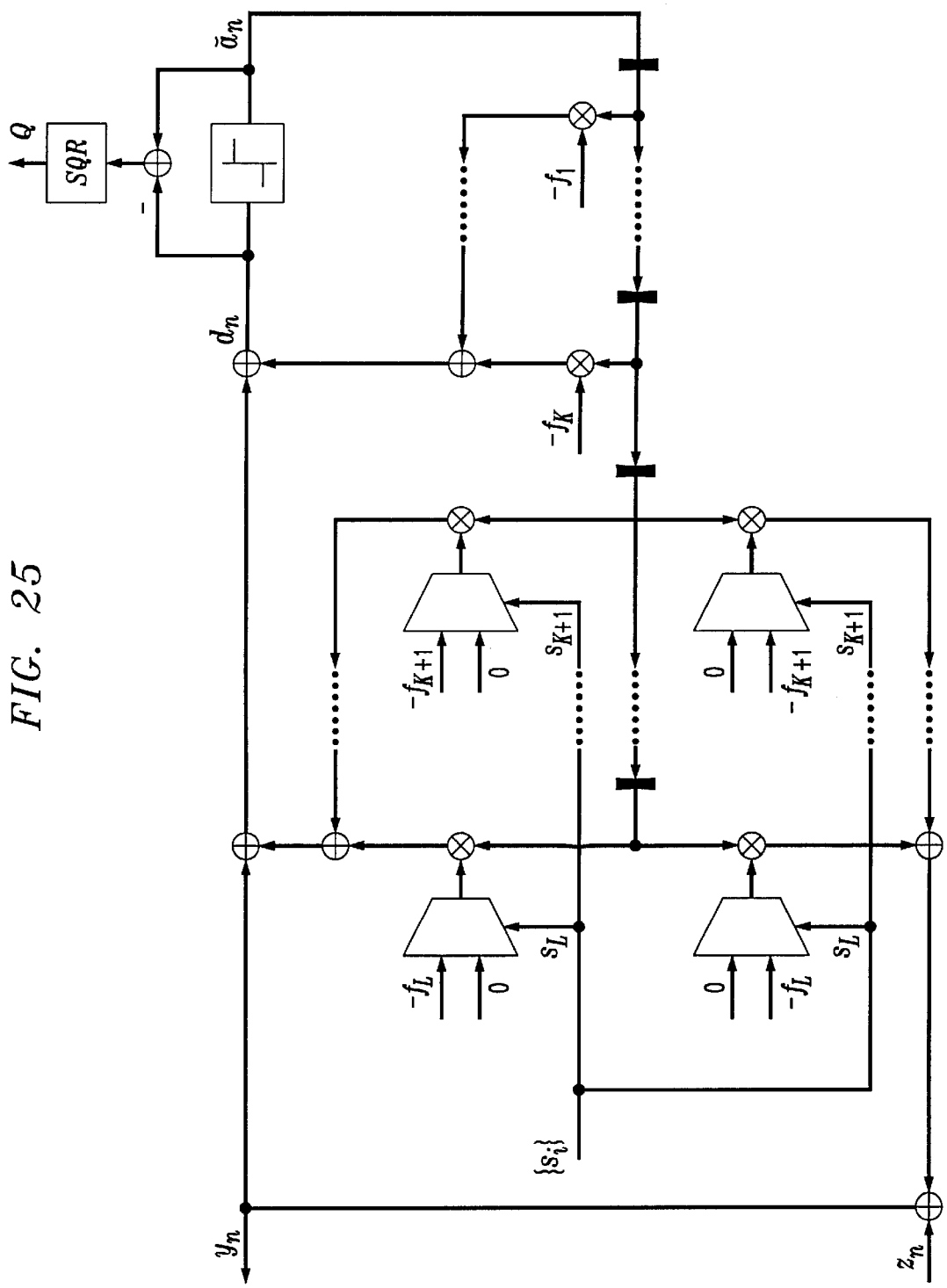
FIG. 25 is a schematic block diagram of a TS-DFP structure of the present invention illustrating one embodiment of obtaining a channel quality metric from the TS-DFP.

FIG. 25 is an embodiment of the TS-DFP circuit illustrated in FIG. 24. FIG. 25 illustrates that the channel quality metric can be derived from the TS-DFP circuit structure by computing the mean-squared error. In this case, the channel quality metric, Q, is obtained as the square of the difference between $d_n$ and $a_n$, where $d_n$ is given by equation (13). $a_n$ represents the value of $d_n$ at the output of the slicer 2702. The noisier the channel, the larger the difference between $d_n$ and $a_n$. The difference measure is averaged over time for use as the quality metric. The squared difference is fed back to the power control unit 2506 of FIG. 24 to adjust the V, E, or T threshold accordingly.

By adjusting V, E, or T, corresponding to the respective embodiments, it is shown that a power saving may be realized in that fewer coefficients are processed in the more power consumptive TS-RSSE 608 when it is determined that the channel quality is acceptable. It is therefore recognized that by adaptively shifting a portion of the processing load from the TS-RSSE 608 to the TS-DFP 504, when appropriate, a power savings is realized.

While the invention is susceptible to various modifications and alternative forms, specific embodiments thereof have been shown by way of example in the drawings and have been described in detail. It should be understood, however, that it is not intended to limit the invention to the particular forms disclosed, but on the contrary, the intention is to cover all modifications, equivalents and alternatives falling within the spirit and scope of the invention as defined by the appended claims.

What is claimed is:

1. A method for processing a received signal from a dispersive channel, said channel having a memory length L and being modeled as a filter having (L+1) taps, indexed zero through L, where each said (L+1) taps has associated therewith a channel coefficient, wherein those channel coefficients whose associated index is in the range one through K are referred to as non tap-selectable coefficients and those (L-K) channel coefficients whose associated index is in the range K+1 through L are referred to as (L-K) tap-selectable coefficients, said method comprising the steps of:

estimating the (L+1) channel coefficients associated with the (L+1) taps by analyzing said received signal;

selecting V channel coefficients from the (L-K) tap-selectable coefficients which satisfy a predetermined criteria, where V is a number of the channel coefficients selected;

processing the K non tap-selectable channel coefficients and the selected V channel coefficients with a high complexity cancellation algorithm; and processing L-(K+V) non-selected tap-selectable coefficients with a lower complexity cancellation algorithm.

2. The method according to claim 1, wherein the number V is an independent value in the range 0 to (L-K), and K is an independent value in the range 0 to L.

3. The method according to claim 1, wherein the predetermined criteria is determined by selecting channel coefficients having a highest squared value.

4. The method according to claim 1, wherein the predetermined criteria is determined by selecting channel coefficients having a highest absolute value.

5. The method according to claim 1, wherein the predetermined criteria is determined by selecting channel coefficients whose squared value is above a predetermined coefficient threshold.

6. The method according to claim 1, wherein the predetermined criteria is determined by selecting channel coefficients whose absolute value is above a predetermined coefficient threshold.

7. The method according to claim 1, wherein the predetermined criteria is determined in accordance with the following steps:

establishing a unique predetermined coefficient threshold for each of said (L-K) tap-selectable coefficients;

comparing one of an absolute value and a squared signal value for each of said (L-K) tap-selectable channel coefficients with an associated predetermined coefficient threshold; and selecting a channel coefficient when said one of the absolute value and the squared signal value is above said associated predetermined coefficient threshold.

8. The method according to claim 1, wherein the predetermined criteria is determined in accordance with the following steps:

establishing a summation threshold;

sorting the (L-K) tap selectable channel coefficients in one of a decreasing absolute value order and a squared value order;

initializing a variable value of a summation counter to zero; and adding one of the decreasing absolute value and the squared value of said sorted (L-K) tap selectable channel coefficients until it is determined that the summation counter variable value is equal to or greater than a summation threshold.

9. The method according to claim 1, wherein the estimating and selection steps are performed periodically.

10. The method according to claim 1, wherein the estimating and selection steps are performed upon receiving a packet transmission.

11. The method according to claim 1, where said lower complexity cancellation algorithm is a tap-selectable decision-feedback prefilter (TS-DFP).

12. The method according to claim 11, wherein said TS-DFP reduces the intersymbol interface for said L-(K+V) non-selected tap-selectable coefficients, by calculating $y_n$ as an input into said high complexity cancellation algorithm, where $y_n$ at time n is calculated as:

$$y_n = z_n - \sum_{i=K+1}^{L} \bar{s}_i f_i \breve{a}_{n-i}$$

where $\bar{s}_i$ is the negation of $s_i$ and $\breve{a}_n$ is a tentative decision, and $s_i$ is a tap control signal;

$f_i$ are the channel coefficients, whose index i is in the range K+1 to L; and $z_n$ is the received signal.

13. The method according to claim 12 wherein the tap control signal, $s_i$, is 1 for selected tap-selectable coefficients and 0 for non-selected tap-selectable coefficients.

14. The method according to claim 12, where $\breve{a}_n$ is obtained by slicing $$d_n = z_n - \sum_{i=1}^{L} f_i \breve{a}_{n-i}$$

into a hard value.

15. The method according to claim 12, where $\check{a}_n$ is obtained by slicing $$d_n = z_n - \sum_{i=1}^{L} f_i \check{a}_{n-i}$$

into a soft value.

16. The method according to claim 1, wherein said high complexity cancellation algorithm is performed by a tap-selectable reduced state sequence estimator (TS-RSSE).

17. The method according to claim 16, wherein said TS-RSSE reduces the intersymbol interference for the K non tap-selectable channel coefficients, by estimating the intersymbol interference in accordance with the following equation:

$$u_n(\tau_n) = \sum_{i=1}^{K} f_i \hat{a}_{n-i}(\tau_n)$$

where $f_i$ are channel coefficients, whose index i is in the range 1 to K, and $\hat{a}_{n-i}(\tau_n)$ is the survivor symbol corresponding to the data symbol $a_{n-i}$ from the survivor path into state $\tau_n$ at time n.

18. The method according to claim 16, wherein said TS-RSSE reduces the intersymbol interference for the V selected channel coefficients, by estimating the intersymbol interference in accordance with the following equation:

$$v_n(\tau_n) = \sum_{j=1}^{j=V} f_{i_j} \hat{a}_{n-i_j}(\tau_n)$$

where $f_{ij}$ are said V selected channel coefficients of index i and whose index j is in the range 1 to V; and $\hat{a}_{n-i_j}(\tau_n)$ is the survivor symbol corresponding to the data symbol $a_{n-i_j}$ from the survivor path into state $\tau_n$.

19. The method according to claim 16, wherein said TS-RSSE reduces the intersymbol interface for the V selected channel coefficients, by estimating the intersymbol interference in accordance with the following equation:

$$v_n(\tau_n) = \sum_{i=K+1}^{L} s_i f_i \hat{a}_{n-i}(\tau_n)$$

where $f_i$ are the channel coefficients, whose index i is in the range K+1 to L;

$s_i$ are tap control signals for selecting the V channel coefficients; and $\hat{a}_{n-i}(\tau_n)$ is the survivor symbol corresponding to the data symbol $a_{n-i}$, from the survivor path into state $\tau_n$ at time n.

20. The method according to claim 11, wherein said TS-DFP reduces the intersymbol interference for the L−(K+V) non-selected tap-selectable coefficients, by calculating $y_n$, in accordance with the following equation:

$$y_n = z_n - \sum_{i=K+1}^{L} \bar{s}_i f_i \check{a}_{n-i}$$

where $\bar{s}_i$ is the negation of $s_i$;

$f_i$ are the channel coefficients whose index i is in the range K+1 to L;

$\check{a}_{n-i}$ is the survivor symbol from the survivor path leading into the state with the best path metric, i.e. $\check{a}_{n-i} = \hat{a}_{n-i}(\tau'_n)$ and $\tau'_n$ is the reduced state associated with a TS-RSSE technique having the best path metric at time n; and $y_n$ is an input to the high complexity cancellation algorithm.

21. A receiver that receives a signal from a dispersive channel, said channel having a memory length, L, and being modeled as a filter having (L+1) taps, indexed zero through L, where each of said (L+1) taps has associated therewith a channel coefficient, wherein those (L+1) channel coefficients whose associated index is in the range one through K are referred to as non tap-selectable coefficients and those (L+1) channel coefficients whose associated index is in the range K+1 through L are referred to as (L−K) tap-selectable coefficients, said receiver comprising:

a channel estimator for determining the (L+1) channel coefficients associated with the (L+1) taps by analyzing a received signal;

a tap selector for selecting V of the (L−K) tap-selectable coefficients satisfying a predetermined criteria, where V is a number of coefficients selected;

a tap-selectable decision feedback prefilter (TS-DFP) circuit for:

receiving (L−K) tap control signals from said tap selector;

receiving said (L−K) tap-selectable coefficients from a channel estimator;

receiving (L−K) symbols from the TS-RSSE which correspond to said (L−K) tap-selectable coefficients; and processing the intersymbol interference associated with L−(K+V) channel coefficients from among said (L−K) tap-selectable coefficients;

a tap selectable reduced state sequence estimator (TS-RSSE) circuit for:

receiving said (L−K) tap control signals and L channel coefficients from among said (L+1) channel coefficients, indexed one through L;

processing the intersymbol interference associated with the V selected channel coefficients and K non tap-selectable channel coefficients; and selecting the best survivor path for each state of a trellis by performing an add-compare-select operation.

22. A receiver that receives a signal from a dispersive channel, said channel having a memory length, L, and being modeled as a filter having (L+1) taps, indexed zero through L, where each of said (L+1) taps has associated therewith a channel coefficient, wherein those channel coefficients whose associated index is in the range one through K are referred to as non tap-selectable coefficients and those (L−K) channel coefficients whose associated index is in the range K+1 through L are referred to as (L−K) tap-selectable coefficients, said receiver including:

a channel estimator for determining the (L+1) channel coefficients by analyzing a received signal;

a tap selector for selecting V channel coefficients of the (L–K) tap-selectable coefficients satisfying a predetermined criteria, where V is a number of the channel coefficients selected;

a tap-selectable decision feedback prefilter (TS-DFP) circuit for:
  receiving, from a channel estimator, (L–K) tap control signals and L channel coefficients, indexed 1 through L, from said (L+1) channel coefficients; and
  reducing the intersymbol interference associated with L–(K+V) coefficients from among said (L–K) tap-selectable coefficients which were not selected by the tap selector;

a tap selectable reduced state sequence estimator (TS-RSSE) circuit for:
  receiving said (L–K) tap control signals and L channel coefficients from among said (L+1) channel coefficients, indexed one though L;
  processing the intersymbol interference associated with the V selected channel coefficients and K non tap-selectable channel coefficients and;
  selecting the best survivor path for each state of a trellis by performing an add-compare-select operation.

23. The receiver of claim 22, wherein said TS-DFP reduces the intersymbol interference caused by the L–(K+V) non-selected channel coefficients, said TS-DFP comprising:
  a first selector having (L–K) symbol inputs, said first selector selecting L–(K+V) symbols inputs of said (L–K) symbol inputs;
  a second selector having (L–K) channel coefficient inputs, said second selector selecting L–(K+V) channel coefficients of said (L–K) tap-selectable coefficients, wherein the L–(K+V) selected channel coefficients are multiplied by corresponding the L–(K+V) selected symbols to yield L–(K+V) multiplied results, wherein said multiplied results are summed in a summer and added to the received signal to be provided as input to the TS-RSSE;
  a third selector having (L–K) symbol inputs, said third selector selecting V symbol inputs of said L–K symbol inputs;
  a fourth selector having (L–K) channel coefficient inputs, said fourth selector selecting the V channel coefficients of the (L–K) tap-selectable coefficients, wherein said V selected channel coefficients are multiplied by corresponding outputs of said third selector to yield V multiplied results, wherein said multiplied results are summed and added to said input to the TS-RSSE to form an internal signal.

24. The receiver of claim 23, wherein the TS-DFP further comprises a data slicer for obtaining the (L–K) symbol inputs.

25. The receiver of claim 22, wherein said TS-DFP cancels the intersymbol interference caused by the L–(K+V) non-selected channel coefficients, said receiver comprising:
  a first selector having (L–K) symbol inputs, said first selector selecting L–(K+V) symbol inputs of the(L–K) symbol inputs;
  a second selector having (L–K) inputs for the (L–K) tap-selectable coefficients, said second selector selecting L–(K+V) channel coefficients of said (L–K) tap-selectable coefficients, wherein the L–(K+V) selected channel coefficients are multiplied by corresponding ones of the L–(K+V) selected symbol inputs, wherein said multiplied results are summed in a summer and added to the received signal provided as an input to the TS-RSSE.

26. The receiver of claim 25, further comprising a data slicer for obtaining the (L–K) symbol inputs.

27. The receiver of claim 22, wherein said TS-RSSE includes a plurality of U decision feedback cells (U-DFCs) and a plurality of V decision feedback cells (V-DFCs), each of said plurality of U-DFC cells and V-DFC cells are associated with a respective state of a trellis which is processed by the TS-RSSE, each of said plurality of U-DFC cells cancels the intersymbol interference due to the non-selectable K channel coefficients for its respective state, each of said V-DFC cells cancels the intersymbol interference due to the V selected channel coefficients for its respective state.

28. The U-DFCs of claim 27, wherein in each of said plurality of U-DFC cells the non-selectable K channel coefficients are multiplied by corresponding survivor symbols for the respective state.

29. The U-DFCs of claim 28, wherein the survivor symbols correspond to one state of the trellis.

30. The V-DFCs of claim 27, wherein each of said plurality of V-DFC cells compromise:
  a first selector for selecting V channel coefficients from among (L–K) channel coefficients;
  a second selector for selecting V survivor symbols from among (L–K) survivor symbols, wherein the V survivor symbols correspond to said V channel coefficients; and
  a summer for summing the multiplied result of said V selected channel coefficients with corresponding ones of the V selected survivor symbols.

31. The V-DFCs of claim 30, wherein the survivor symbols correspond to one state of the trellis.

32. The V-DFCs of claim 27, wherein in each of said plurality of V-DFC cells, (L–K) multiplexers select V channel coefficients for multiplication by corresponding survivor symbols, each one of said plurality of V-DFC cells corresponding to one state from among a number R of states of the trellis.

33. The receiver of claim 22, wherein said TS-DFP further includes (L–K) multiplexers for selecting L–(K+V) channel coefficients from among said (L–K) tap-selectable coefficients, the selected L–(K+V) channel coefficients are multiplied by corresponding ones of a group of (L–K) symbols to form L–(K+V) partial products and summing said L–(K+V) partial products and adding said summed L–(K+V) partial products to the received signal to be provided as an input to the TS-RSSE.

34. A method for reducing the power consumption in a receiver that receives a signal from a dispersive channel, said channel having a memory length, L, and being modeled as a filter having (L+1) taps, indexed zero through L, where each of said (L+1) taps has associated therewith a channel coefficient, wherein those channel coefficients whose associated index is in the range one through K are referred to as non tap-selectable coefficients and those (L–K) channel coefficients whose associated index is in the range K+1 through L are referred to as tap-selectable coefficients, said method comprising the steps of:
  measuring a channel quality metric of a received signal;
  comparing the measured channel quality metric with a predetermined threshold to determine whether said channel quality metric is above or below said predetermined threshold;
  decreasing the number of coefficients to be processed by a tap-selectable reduced state sequence estimator (TS-RSSE) when it is determined that said channel quality metric is above said predetermined threshold, indicating a high quality channel;

increasing the number of coefficients to be processed by said tap-selectable reduced state sequence estimator (TS-RSSE) when it is determined that said channel quality metric is below said predetermined threshold, indicating a low quality channel;

increasing the number of coefficients to be processed by a tap-selectable decision feedback prefilter (TS-DFP) when it is determined that said channel quality metric is above said predetermined threshold, indicating a high quality channel;

decreasing the number of coefficients to be processed by a tap-selectable decision feedback prefilter (TS-DFP) when it is determined that said channel quality metric below said predetermined threshold, indicating a low quality channel.

35. The method according to claim 34, wherein the measurement and comparison step are performed periodically.

36. The method according to claim 34, wherein the channel quality metric is a signal-to-noise ratio (SNR).

37. A method for reducing the power consumption in a receiver that receives a signal from a dispersive channel, said channel having a memory length, L, and being modeled as a filter having (L+1) taps, indexed zero through L, where each of said (L+1) taps has associated therewith a channel coefficient, wherein those channel coefficients whose associated index is in the range one through K are referred to as non tap-selectable coefficients and those (L−K) channel coefficients whose associated index is in the range K+1 though L are referred to as tap-selectable coefficients, said method comprising the steps of:

measuring a channel quality metric of a received signal;

comparing the measured channel quality metric with a predetermined threshold to determine whether said channel quality metric is above or below said predetermined threshold;

decreasing the number of coefficients to be processed by a tap-selectable reduced state sequence estimator (TS-RSSE) when it is determined that said channel quality metric is below said predetermined threshold, indicating a high quality channel;

increasing the number of coefficients to be processed by said tap-selectable reduced state sequence estimator (TS-RSSE) when it is determined that said channel quality metric is above said predetermined threshold, indicating a low quality channel;

increasing the number of coefficients to be processed by a tap-selectable decision feedback prefilter (TS-DFP) when it is determined that said channel quality metric is below said predetermined threshold, indicating a high quality channel;

decreasing the number of coefficients to be processed by a tap-selectable decision feedback prefilter(TS-DFP) when it is determined that said channel quality metric is above said predetermined threshold, indicating a low quality channel.

38. The method according to claim 37, wherein the channel quality metric is one of a bit error rate (BER), a mean squared error, a packet error rate, and a path metric of the best state.

39. The method according to claim 37, wherein the measurement and comparison step are performed periodically.

40. A method for reducing the power consumption in a receiver that receives a signal from a dispersive channel, said channel having a memory length, L, and being modeled as a filter having (L+1) taps, indexed zero through L, where each of said (L+1) taps has associated therewith a channel coefficient, wherein those channel coefficients whose associated index is in the range one through K are referred to as non tap-selectable coefficients and those (L−K) channel coefficients whose associated index is in the range K+1 through L are referred to as (L−K) tap-selectable coefficients, said method comprising the steps of:

measuring a channel quality metric of a received signal;

comparing the measured channel quality metric with a predetermined threshold to determine whether said channel quality metric is above or below said predetermined threshold;

sorting the (L−K) tap-selectable coefficients by one of a decreasing absolute signal value and a squared value order;

selecting either i) a number V of channel coefficients of the (L−K) tap-selectable coefficients, where the number V is less than a number of the (L−K) tap-selectable coefficients selected in a previous selection interval when it is determined that said channel quality metric is below said predetermined threshold, indicating a high quality channel; or ii) the number V of channel coefficients of the (L−K) tap-selectable coefficients, where the number V is greater than a number of the (L−K) tap-selectable coefficients selected in a previous selection interval when it is determined that said channel quality metric is above said predetermined threshold, indicating a low quality channel;

processing intersymbol interference (ISI) associated with said V selected channel coefficients and K non-selectable channel coefficients in tap-selectable reduced state sequence estimator (TS-RSSE); and processing the ISI associated with the L−(K+V) non-selected channel coefficients in tap-selectable decision feedback prefilter (TS-DFP).

41. The method according to claim 40, wherein the measurement and comparison step are performed periodically.

42. The method according to claim 40, wherein the measurement and comparison step are performed at one of a reception of a packet and subsequent to the reception of a packet.

43. The method according to claim 40, where the quality metric is one of a bit error rate (BER), a mean squared error, a packet error rate, and a path metric of the best state.

44. A method for reducing the power consumption in a receiver that receives a signal from a dispersive channel, said channel having a memory length, L, and being modeled as a filter having (L+1) taps, indexed zero through L, where each of said (L+1) taps has associated therewith a channel coefficient, wherein those channel coefficients whose associated index is in the range one through K are referred to as non tap-selectable coefficients and those (L−K) channel coefficients whose associated index is in the range K+1 through L are referred to as (L−K) tap-selectable coefficients, said method comprising the steps of:

measuring a channel quality metric of a received signal;

determining whether the measured channel quality metric is above or below a predetermined metric threshold;

raising a coefficient threshold when it is determined that the measured channel quality metric is below said predetermined metric threshold, indicating a high quality channel;

lowering said coefficient threshold when it is determined that the measured channel quality metric is above said predetermined metric threshold;

comparing one of a squared signal value and an absolute signal value associated with (L−K) channel coefficients with said coefficient threshold to determine whether the (L−K) tap-selectable coefficients are equal to or greater than said coefficient threshold;

processing those channel coefficients which are determined to be equal to or greater than said coefficient threshold with a higher complexity cancellation algorithm; and processing those channel coefficients which are determined to be less than said coefficient threshold with a lower complexity cancellation algorithm.

45. A method according to claim 44, wherein the measurement and comparison step are performed periodically.

46. The method according to claim 44, wherein the measurement and comparison step are performed at one of a reception of a packet and subsequent to the reception of a packet.

47. The method according to claim 44, wherein the channel quality metric is one of a bit error rate (BER), a mean squared error, and a path metric of the best state.

48. A method for processing a signal received from a dispersive channel, said channel having a memory length L and being modeled as a filter having (L+1) taps, indexed zero through L, where each of said (L+1) taps has associated therewith a channel coefficient, wherein those channel coefficients whose associated index is in the range one through K are referred to as non tap-selectable coefficients and those (L−K) channel coefficients whose associated index is in the range K+1 through L are referred to as (L−K) tap-selectable coefficients, said method comprising:

means for estimating the (L+1) channel coefficients associated with the (L+1) taps by analyzing said received signal;

means for selecting V channel coefficients from the (L−K) tap-selectable coefficients which satisfy a predetermined criteria, where V is a number of the channel coefficients selected;

first processing means for processing K non tap-selectable channel coefficients and the selected V channel coefficients with a higher complexity cancellation algorithm; and second processing means for processing the L−(K+V) non-selected tap-selectable channel coefficients with a lower complexity cancellation algorithm.

* * * * *